United States Patent [19]
Inoue et al.

[11] Patent Number: 5,732,315
[45] Date of Patent: Mar. 24, 1998

[54] PAPER DELIVERY AND STACKER UNIT IN AN IMAGE FORMING APPARATUS

[75] Inventors: Makoto Inoue; Tatsuhiro Taniwa; Tomoaki Fukuda, all of Kato-gun, Japan

[73] Assignee: Fujitsu Limited, Kawasaki, Japan

[21] Appl. No.: 758,212

[22] Filed: Nov. 27, 1996

Related U.S. Application Data

[63] Continuation of Ser. No. 189,849, Feb. 1, 1994, abandoned.

[30] Foreign Application Priority Data

| Feb. 18, 1993 | [JP] | Japan | 5-029260 |
| Feb. 26, 1993 | [JP] | Japan | 5-038731 |
| Feb. 26, 1993 | [JP] | Japan | 5-038732 |
| Feb. 26, 1993 | [JP] | Japan | 5-038814 |
| Aug. 20, 1993 | [JP] | Japan | 5-206596 |

[51] Int. Cl.⁶ .................. G03G 15/14; G03G 21/00
[52] U.S. Cl. .................. 399/317; 270/40; 270/41; 399/384; 399/397; 493/411; 493/413
[58] Field of Search .................. 399/121, 316, 399/317, 384, 388, 397; 270/40, 41; 493/409, 410, 411, 413, 414

[56] References Cited

U.S. PATENT DOCUMENTS

| 4,110,027 | 8/1978 | Sato et al. | 355/274 |
| 4,116,556 | 9/1978 | Tanaka et al. | 355/274 X |
| 4,401,428 | 8/1983 | Thomas et al. | 493/411 X |
| 4,508,527 | 4/1985 | Uno et al. | 270/40 X |
| 4,828,540 | 5/1989 | Fordyce | 493/414 |
| 4,908,010 | 3/1990 | Yoshioka | 270/40 X |
| 4,929,982 | 5/1990 | Ainoya et al. | 355/274 X |
| 4,990,966 | 2/1991 | Sindo | 355/321 |
| 5,105,227 | 4/1992 | Kitamura et al. | 355/274 |
| 5,155,539 | 10/1992 | Yamaguchi et al. | 355/274 X |
| 5,166,736 | 11/1992 | Ogawa et al. | 355/321 X |
| 5,219,321 | 6/1993 | Schwebbach | 493/414 |
| 5,220,396 | 6/1993 | Monma et al. | 355/274 X |
| 5,257,080 | 10/1993 | Johroku et al. | 355/321 |
| 5,317,371 | 5/1994 | Monma et al. | 355/274 |

*Primary Examiner*—Fred L. Braun
*Attorney, Agent, or Firm*—Armstrong, Westerman, Hattori, McLeland & Naughton

[57] ABSTRACT

An image forming apparatus which includes a paper delivery unit which is provided as to be rockable and displaceable between an operating position close to a photosensitive drum and a standby position remote from the photosensitive drum; a supporting link system, operably coupled to the paper delivery unit, for holding the paper delivery unit at the operating position; and energizing device, operably coupled to the supporting link system, for energizing the paper delivery unit so as to move from the standby position to the operating position. The paper delivery unit includes a transferring device for transferring a toner image from the photosensitive drum onto a sheet, a tractor for feeding the sheet, disposed in the upstream of the transferring device in a paper delivery direction, and a suction feeder for holding and delivering the sheet, disposed in the downstream of the transferring device in the paper delivery direction. A delivery unit frame for supporting the transferring device, the tractor and the suction feeder is pivotally supported by a body frame disposed in the upstream in the paper delivery direction. In other words, the paper delivery unit is held at its operating position by way of the supporting link system, and is moved back to the position from its retracted position by way of the energizing device. The paper delivery unit is thus capable of moving to and from an operating position for, e.g., ease of cleaning the transferring device or removing jammed papers.

45 Claims, 25 Drawing Sheets

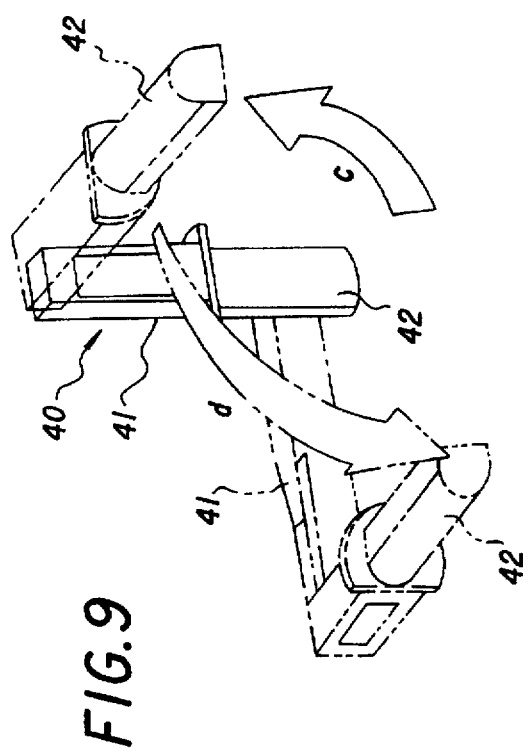
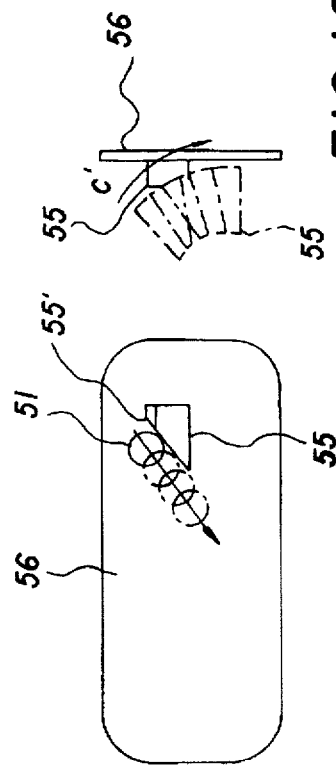
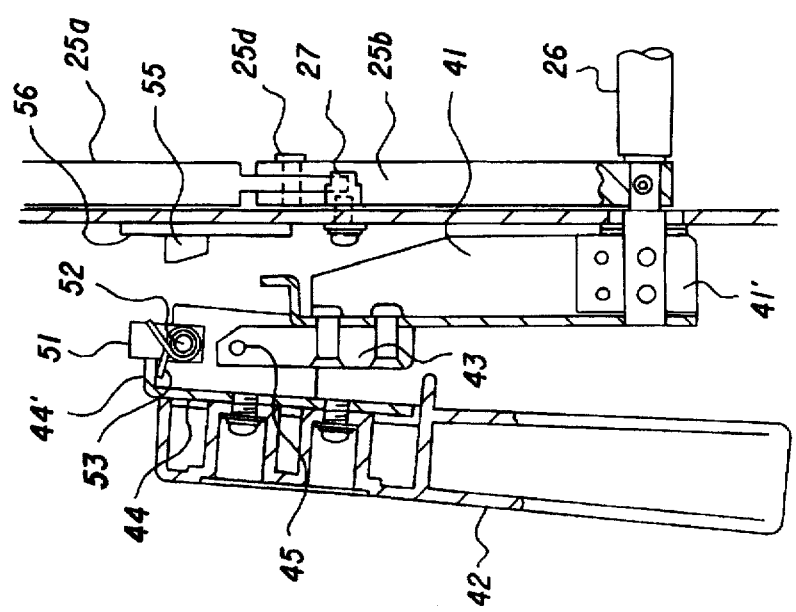

FIG.14
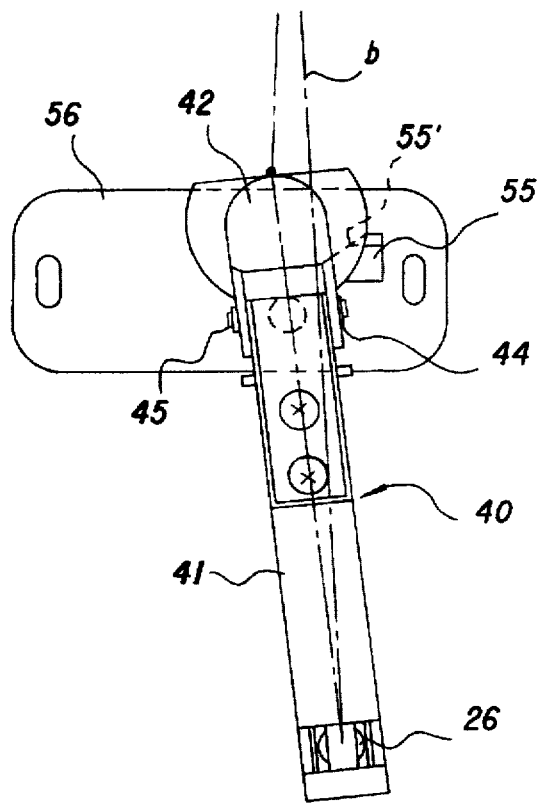
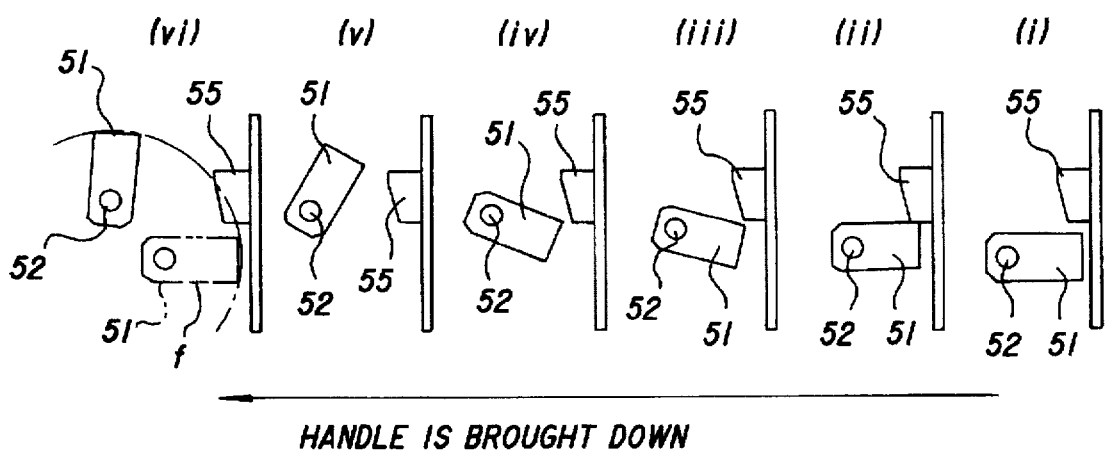
HANDLE IS BROUGHT DOWN
FIG.15

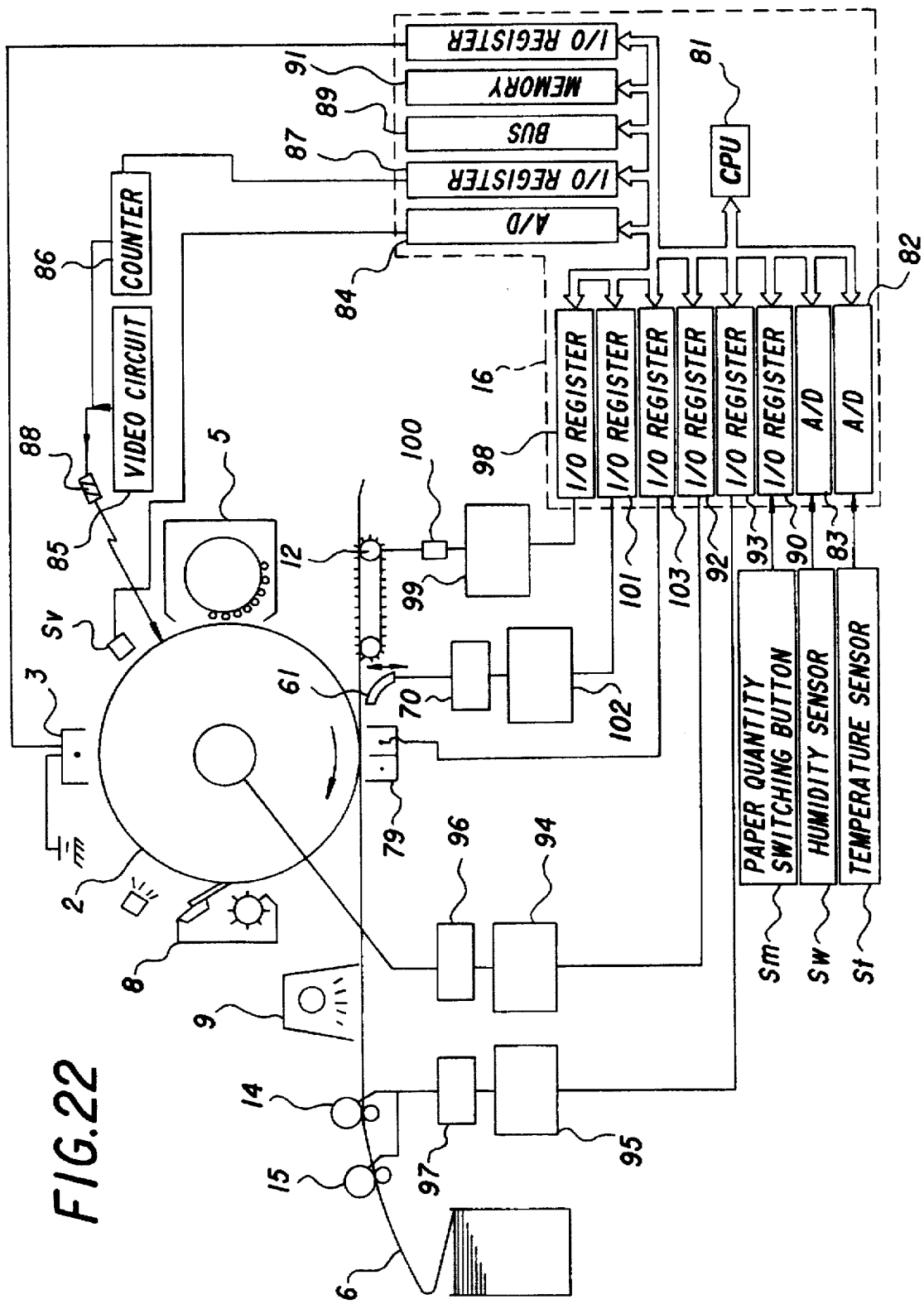

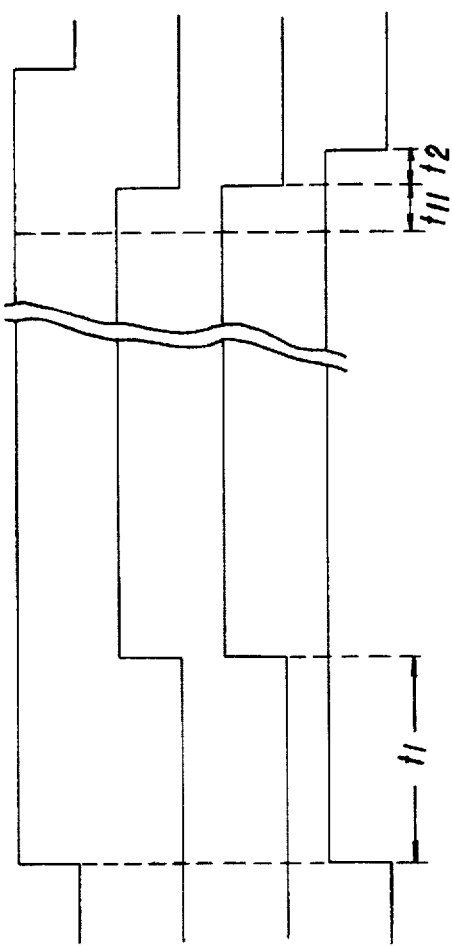

MOTOR FOR PHOTOSENSITIVE DRUM

TRANSFERRING CHARGER, TRANSFERRING GUIDE

TRACTOR

SUCTION FAN

DISCHARGE ROLLERS, SCUFF ROLLERS

PAPER DELIVERY AND STACKER UNIT IN AN IMAGE FORMING APPARATUS

This application is a continuation of application Ser. No. 08/189,849, filed Feb. 1, 1994, now abandoned.

BACKGROUND OF THE INVENTION

1. Field of the Invention

The present invention generally relates to an image forming apparatus such as a copying machine, printer or facsimile and, more particularly, to improvements in a paper delivery unit and stacker unit which are incorporated in an image forming apparatus.

2. Description of the Related art

A known image forming apparatus such as a copying machine, printer or facsimile is generally designed to perform image formation in the following procedure: In an optical system, the surface of a photosensitive drum is exposed to a light image of an original to form an electrostatic latent image on the photosensitive drum. Then, electrically charged toner is adhered to the electrostatic latent image by a developing device to form a toner image and this toner image is transferred onto a paper sheet by a transferring device. The toner image thus transferred is fixed on the paper sheet by a fixing device.

One example of conventional image forming apparatus is shown in FIG. 41. In the apparatus shown in FIG. 41, a sheet (continuous form) 131 is pulled out of a hopper unit 132 by a tractor housed in a delivery unit 133 disposed above the hopper unit 132, and then delivered so as to be placed between a photosensitive drum 135 and a transferring guide 134 which is also housed in the delivery unit 133. Thereafter, the sheet 131 takes a U-turn being guided by the transferring guide 134 so that it reaches a fixing device 136. The sheet 131 is then guided by scuff rollers 137 to be sequentially stacked in a stacker unit 138. Although it is not shown in the FIG. 41, the stacker unit 138 is provided with a swing guide which is capable of swinging back and forth and positioned under a fixedly attached paper guide. The swing guide causes the sheet 131 to be swung back and forth and to be folded in accordance with folding lines regularly formed thereon, so that the sheet 131 is placed on a paper receiving tray with its front face and back face alternately facing up.

Such an image forming apparatus, however, presents the following problems since the sheet 131 takes a U-turn while being guided by the transferring guide 134.

(1) Usually, the hopper unit 132 and stacker unit 138 are aligned laterally or vertically. When they are in a lateral arrangement, a large space is needed for installing the apparatus. On the other hand, when they are in a vertical arrangement, the heights of the sheet 131 stacked on both the hopper unit 132 and the stacker unit 138 are restricted.

(2) When an automatic loader is used for guiding the sheet 131 so as to be positioned between the transferring guide 134 and the photosensitive drum 135, a mechanism for reversing the sheet 131 is necessary. This makes the structure of the apparatus more complicated, which decreases the reliability thereof.

In order to solve the above problems, there has been proposed an image forming apparatus in which the so-called "horizontal delivery method" is adopted. According to this method, the hopper unit is disposed outside the apparatus and the sheet is delivered from one end (first end) of the apparatus to the other (second end) in a substantially horizontal condition. The sheet is turned over at the second end, and then collected in the stacker unit provided at the second end. In the image forming apparatus employing the horizontal delivery method, the sheet in the hopper unit is pulled out in a substantially horizontal direction by means of the tractor and delivered in a direction tangential to the photosensitive drum. At a position opposite to the photosensitive drum is disposed a transferring device including a transferring guide for bringing the sheet into close contact with the photosensitive drum.

In such an image forming apparatus, it is necessary to position the transferring device in relation to the photosensitive drum with high dimensional accuracy. In addition, a retracting system is needed for retracting the transferring device at a distance from the photosensitive drum in order to keep a sufficient space between the transferring device and the photosensitive drum at the time of periodical check-ups, cleaning or removal of a sheet which has been jammed during the operation. In cases where the image forming apparatus employing the above-described horizontal delivery method is used, it is particularly desirable that the retracting system is so designed as to retract the transferring device integrally with the tractor and the suction feeder, the tractor and suction feeder being provided in front of and behind the transferring device, respectively.

Further, it is desirable to provide the above transferring device with a transferring guide that is capable of promptly performing such operations as (i) bringing the sheet into close contact with the photosensitive drum at a start of printing and (ii) separating the sheet from the photosensitive drum at the time of suspension of printing, so that the reliability of the apparatus can be increased and maintenance can be easily carried out.

In the above image forming apparatus, when the swing angle of the swing guide in the stacker unit is great, high friction resistance occurs between the swing guide and the sheet, causing instability in the travel of the sheet. It is, therefore, required that the friction resistance of the swing guide, which is exerted on the sheet should be reduced as small as possible in order to avoid the occurrence of a paper jam.

Further, the image forming apparatus employing the horizontal delivery method has a disadvantage in that since the deflection of the sheet in the direction of its thickness is not controlled when the sheet travels from the tractor to the fixing device, the sheet is likely to be slackened between the photosensitive drum and the scuff rollers when the paper sheet is jammed in the stacker unit during the operation. This slack brings unfixed images positioned between the fixing device and the photosensitive drum into contact with the photosensitive drum with the result that the images are marred or objectionable blurs are produced on the sheet. Even if the transferring guide is retracted to a standby position to separate the sheet from the photosensitive drum when printing is suspended, the sheet is electrostatically attracted to the photosensitive drum so that blurs are unavoidably produced on the sheet. It is therefore required to positively avoid the damage of images and blurs on the sheet due to the slack of the sheet.

The present invention has been made in view of the foregoing problems and is intended to provide an image forming apparatus capable of efficiently performing the delivery and stacking of a sheet without causing the damage of images and blurs on the sheet and capable of simplifying maintenance.

More specifically, one of the objects of the invention is to provide an image forming apparatus in which high operability is achieved by employing (i) an improved delivery unit including a transferring device, a tractor and a suction feeder which are disposed with the transferring device between and (ii) an improved supporting system for the delivery unit, and in which a simplified retraction system for retracting the delivery unit from an operating position is employed.

Another object of the invention is to provide an image forming apparatus having a transferring guide which enables a prompt separation of a sheet from a photosensitive drum and smooth automatic loading of a sheet, and which simplifies maintenance.

A further object of the invention is to provide an image forming apparatus that has a sheet slack preventing system for preventing a sheet from being slackened in the downstream of the photosensitive drum when the sheet is jammed during the operation of the apparatus whereby the damage of images and blurs on the sheet are prevented, and for positively separating the sheet from the photosensitive drum at the time of suspension of printing.

A further object of the invention is to provide an image forming apparatus having a sheet folding system for properly folding a sheet which is sent to a stacker unit being guided by a swing guide, without causing instability in the travel of the sheet, whereby the occurrence of a paper jam can be prevented.

SUMMARY OF THE INVENTION

The above objects and advantages of the invention are achieved by an image forming apparatus described below.

According to one aspect of the invention, there is provided an image forming apparatus comprising:

(a) a paper delivery unit which is provided as to be rockable and displaceable between an operating position close to a photosensitive drum and a standby position remote from the photosensitive drum;

(b) a supporting link system for holding the paper delivery unit at the operating position; and (c) energizing means for energizing the paper delivery unit so as to move from the standby position to the operating position.

In such an image forming apparatus, the paper delivery unit provided in the paper delivery path is usually held at the operating position close to the photosensitive drum by means of the supporting link system. When cleaning the transferring device or removing a jammed sheet, the paper delivery unit is moved from the operating position to the standby position by manipulating the supporting link system so that a space can be easily created between the paper delivery unit and the photosensitive drum. When returning the paper delivery unit from the standby position to the operating position, the paper delivery unit can be easily moved by the energizing means.

The paper delivery unit comprises a transferring device for transferring a toner image from the photosensitive drum onto a sheet; a tractor for feeding the sheet, disposed in the upstream of the transferring device in a paper delivery direction; and a suction feeder for holding and delivering the sheet, disposed in the downstream of the transferring device in the paper delivery direction. It is preferable that the transferring device, the tractor and the suction feeder are supported by a delivery unit frame which is pivotally supported on a body frame disposed in the upstream in the paper delivery direction.

Preferably, the supporting link system has upper links and lower links and each upper link is coupled to either of the lower links by an intermediate connecting pin. The upper end of each upper link is connected to the movable end of the paper delivery unit while the lower end of each lower link is movably supported by the body frame. In this case, a fulcrum shaft preferably spans the lower ends of the lower links, being in contact with fulcrum shaft supporting springs which act in a direction to raise the fulcrum shaft. The fulcrum shaft moves downwards only when each of the intermediate connecting pins exceeds a dead point line. With the supporting link system having the above arrangement, when returning the paper delivery unit from the standby position to the operating position, the fulcrum shaft for the lower links, which is kept at its home position until the intermediate connecting pins in the supporting link system exceed the dead point line, overcomes a lifting force exerted by the fulcrum shaft supporting springs and comes down, exceeding the dead point line. Thereafter, the paper delivery unit is kept at the operating position, being prevented from returning to the standby position by the lifting force of the fulcrum shaft supporting springs. Thus, all the devices incorporated in the paper delivery unit are properly placed in the operating position and this can be confirmed by the operator who feels a "clicking" in his hand when setting the unit in the operating position.

The energizing means may include torsion coil springs arranged such that the movable operating part of the torsion coil spring faces the pivotally supported side of the paper delivery unit. The movable operating part preferably comprises a supporting spring saddle attached to the torsion coil springs as well as rollers which are disposed at the leading end of the supporting spring saddle, being in contact with the bottom face of the paper delivery unit. With this arrangement, the energizing force of the energizing means at the time of the return of the paper delivery unit from the standby position to the operating position can be increased as the energizing means comes closer to a specified position, thereby facilitating the movement of the paper delivery unit. Furthermore, since the paper delivery unit is moved with the help of the rollers which are in contact with the bottom face thereof, the movement can be easily carried out.

In the preferable arrangement, there are provided an operation handle system which is disposed in the exterior of the body frame, being coupled to the supporting link system, and lock releasing means consisting of parts provided at the base end of the operation handle system and at the side of the body frame opposite to the base end of the operation handle system. When the operation handle system is operated, the lock releasing means releases the paper delivery unit from its locked condition established by the supporting link system.

Preferably, the operation handle system comprises a lever with its base end fixedly attached to the fulcrum shaft of the supporting link system outside the body frame; and a handle with its base end pivotally supported at the leading end of the lever such that the handle can be raised and brought down. The lever of the operation handle system is secured to the fulcrum shaft at the base end thereof in such a manner that the lever is opposite to one of the lower links of the supporting link system.

The lock releasing means preferably comprises a cam which is provided on the outer face of the body frame so as to face the position where the lever and handle of the operation handle system are pivotally attached to each other, when the paper delivery unit is set in the operating position; and a releasing member attached to the base end of the handle, being opposite to the cam. The lock releasing means is so designed to release lifting force exerted on the fulcrum shaft of the supporting link system by engaging the releasing member with the inclined surface of the cam, such engagement being carried out by raising the handle.

After the paper delivery unit has been set in the operating position, the operation handle system is kept at a specified position, whereby the paper delivery unit can be locked at the operating position. The paper delivery unit cannot be moved to the standby position unless the lock releasing means is operated by the operation handle system. The paper delivery unit can be moved from the operating position to the standby position in the following manner. The handle of the operation handle system is raised, thereby bringing the releasing member attached to the base end of the handle into contact with the cam at the body frame in the opposite position. The fulcrum shaft of the supporting link system coupled to the operation handle system is then momentarily pressed down against the retention force of the fulcrum shaft supporting springs. This allows the supporting link system to exceed the dead point line and the movement of the paper delivery unit to the standby position is easily accomplished accordingly.

According to another aspect of the invention, there is provided an image forming apparatus including a transferring guide comprising:

(a) a first paper guide means for pressing one face of a sheet such that the sheet moves in a direction to be separated from a photosensitive drum;

(b) a second paper guide means for pressing the other face of the sheet that the sheet moves in a direction to come in close contact with the photosensitive drum and;

(c) a driving means being coupled with the first paper guide means and the second paper guide means respectively for driving the first and second paper guide means at the same time by rotating a driving shaft.

In the image forming apparatus having the above arrangement, when a toner image is not to be transferred from the photosensitive drum onto the sheet, the first and second paper guide means are actuated by means of the driving means so that one face of the sheet is pushed by the first paper guide means and the sheet is moved to a remote position where the sheet is remote from the photosensitive drum. On the other hand, when a toner image is to be transferred from the photosensitive drum onto the sheet, the other face of the sheet is pushed by the second paper guide means so that the sheet is moved to a close position where the sheet is in close contact with the photosensitive drum.

In this case, the first paper guide means presses the upper face of the sheet downwards while the second paper guide means presses the lower face of the sheet upwards.

The first and second paper guide means preferably hold the sheet at three positions which are the close position, the remote position and an automatic loading position which is located substantially midway between the close position and the remote position and where the sheet is automatically loaded. At the automatic loading position, the sheet passes smoothly from the first paper guide means to second paper guide means.

The driving means; may be a link system for driving those paper guide means such that the first paper guide means performs its operation faster than the second paper guide means. More particularly, this link system includes, on both sides, a substantially L-shaped rocking lever having an end secured to the driving shaft; and two coupling arms pivotally attached to the other end of the rocking lever at one end thereof by means of two pins. The two pins are substantially equidistant from the driving shaft and shifted from each other by a specified angle with respect to the driving shaft.

The other ends of the coupling arms are pivotally attached to the first paper guide means and the second paper guide means respectively. The use of such a link system enables the sheet to move from the close position to the remote position very quickly without undesirable useless motion, thus increasing the reliability of the apparatus.

It is desirable that the transferring guide is formed as one unit since such an arrangement facilitates maintenance.

According to still another aspect of the invention, there is provided an image forming apparatus comprising:

(a) an upstream paper delivery means provided in the upstream of a photosensitive drum in a paper delivery path;

(b) a downstream paper delivery means provided in the downstream of the photosensitive drum in the paper delivery path; and (c) a controller means for actuating the downstream paper delivery means at substantially the same time when the photosensitive drum starts operation, and actuating the upstream paper delivery means after a specified time has elapsed after a start-up of the photosensitive drum.

In the image forming apparatus as described above, the downstream paper delivery means is actuated simultaneously with a start-up of the photosensitive drum when printing operation is started, and the upstream paper delivery means is actuated after a specified time has elapsed after the start-up of the photosensitive drum. Thus, the sheet which has been slackened due to a paper jam etc. is pulled by the downstream paper delivery means so that the sheet will not come in contact with the photosensitive drum until the transferring guide rises and the damage of images and blurs on the sheet can be avoided.

Pursuant to a further aspect of the invention, there is provided an image forming apparatus comprising:

(a) an upstream paper delivery means provided in the upstream of a photosensitive drum in a paper delivery path;

(b) a downstream paper delivery means provided in the downstream of the photosensitive drum in the paper delivery path; and (c) a controller means for stopping the operation of the downstream paper delivery means after a specified time has elapsed after stopping of the upstream paper delivery means.

In such an image forming apparatus, the downstream paper delivery means is in operation. Thus, tension is provided to the sheet until a specified time elapses after the upstream paper delivery means has been suspended in order to stop the sheet. Due to this tension, the sheet is positively kept away from the photosensitive drum, whereby blurs caused by the contact of the sheet with the photosensitive drum can be prevented.

The specified set time depends on the degree of electrostatic attraction force generated between the sheet and the photosensitive drum. Therefore, it is desirable that the set time is determined according to the electric resistance inherent to the sheet, temperature and humidity, transferring current, the surface potential of the photosensitive drum, the bias voltage and exposure intensity of the developing device and a printing rate (the rate of images printed on a sheet) detected by the printing rate detector means.

In still another aspect of the invention, there is provided an image forming apparatus comprising:

(a) an upstream paper delivery means provided in the upstream of a photosensitive drum in a paper delivery path;

(b) a downstream paper delivery means provided in the downstream of the photosensitive drum in the paper delivery path;

(c) a contact preventing means provided between the downstream paper delivery means and the photosensitive drum, for preventing a sheet positioned between the downstream paper delivery means and the photosensitive drum from coming in contact with the photosensitive drum; and (d) a controller means for actuating the contact preventing means at substantially the same time when the photosensitive drum starts operation or prior to the start-up of the photosensitive drum, and actuating the upstream paper delivery means and the downstream paper delivery means at substantially the same time after a specified time has elapsed after the start-up of the con In such ting means.

In such an image forming apparatus, the contact preventing means is simultaneously actuated with or prior to a start-up of the photosensitive drum when printing operation is started; and after a specified time has elapsed after the start-up of the contact preventing means, the upstream paper delivery means and the downstream delivery means are actuated at substantially the same time. The contact of the sheet with the photosensitive drum before the start of paper delivery is accordingly prevented, so that blurs on the sheet and the damage of unfixed images can be avoided.

In this arrangement, the controller means is preferably designed as to suspend the operation of the contact preventing means after printing operation has started.

The contact preventing means may be a suction fan provided to face the reverse surface of the sheet (that is not the image bearing surface) or a suction belt provided to face the reverse surface of the sheet.

In another aspect of the invention, there is provided an image forming apparatus including a paper folding system comprising a feed roller for sending out a sheet; a swing guide which swings through a specified angle; and a movable paper guide which is disposed between the feed roller and the swing guide and swings following the swing movement of the swing guide.

In such an image forming apparatus, at a passing position where the sheet which has been sent out by the feed roller is passed to the swing guide, the sheet is forcibly guided into the swing guide by the movable paper guide. Further, since the movable paper guide always follows the swing movement of the swing guide, a load (friction resistance) acting on the sheet during the time when the sheet travels from the passing position to the exit end of the swing guide is reduced. This prevents the sheet from traveling in an unstable condition. As a result, the sheet is continuously, properly folded according to folding lines such that the front face and back face of the sheet alternately face up.

In this arrangement, the base end of the movable paper guide may be secured to a fixed paper guide disposed under the feed roller, thus enabling the movable paper guide being supported in a stable condition. Alternatively, the movable paper guide is fixedly attached, at the base end thereof, to the inside of the swing guide, with its movable end being held on a side of the fixed paper guide. In this case, the movable end of the movable paper guide is held in a movable condition by a guide regulating member attached to the fixed paper guide.

Preferably, the movable paper guide consists of two sheets having ends thereof corresponding to the movable end which are cut obliquely with respect to the width direction. These sheets are attached together in such a manner that the inclining directions of their cut ends are opposite to each other. Alternatively, the movable end of the movable paper guide may be produced in the form of a comb. Such shapes are particularly desirable since a contact load imposed on the sheet when the sheet gets out of the movable paper guide can be reduced.

The movable paper guide is preferably formed of synthetic resin sheets or extremely thin metal sheets.

The movable paper guide may be comprised of a lateral member the base end of which is attached to the fixed paper guide and a plurality of chains fixedly attached at one end to the lateral member as to suspend therefrom. These chains are spaced at specified intervals and have a specified length.

The swing guide may be provided, at both inner faces thereof, with a plurality of projecting bars which are bulged out in the travel direction of the sheet. This arrangement reduces friction resistance generated between the swing guide and the sheet being let out.

The swing guide is preferably provided with second feed rollers at the leading end thereof. The second feed rollers are driven by an independent driving machine or by power transmitted from the paper delivery system order to assist forcing out of the sheet.

Other objects of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and accompanying drawings which are given by way of illustration only, and thus are not limitations of the present invention, and wherein:

FIGS. 1 to 40 are for explaining preferred embodiments of an image forming apparatus according to the invention;

FIG. 1 is a schematic view showing a principal part of an image forming apparatus according to one embodiment of the invention;

FIG. 2 is a front view of a delivery unit and its supporting system incorporated in the image forming apparatus according to the embodiment of the invention;

FIG. 4 is a view showing the relationship between the supporting link system and an operation handle system;

FIG. 5 is an enlarged sectional view of the operation handle system;

FIG. 6 is a partially cutaway plan view of the operation handle system;

FIG. 7 is a front view of the operation handle system;

FIG. 8 is a sectional view showing the operation handle system as the handle is folded;

FIG. 9 is an illustration depicting how to use the operation handle system;

FIG. 10A is an illustration depicting the operation of a lock releasing means incorporated in the supporting link system;

FIG. 10B is a side view of FIG. 10A;

FIG. 11 is a front view showing a delivery unit as it has moved to a standby position;

FIG. 12 is a front view showing the delivery unit as it is being positioned in the course of its upward movement;

FIGS. 13A to 13C are illustrations each depicting the operation of the supporting link system;

FIG. 14 is an illustration depicting the operation of the operation handle system;

FIG. 15 is an illustration depicting the returning operation of a lock releasing member;

FIG. 16 is a front view of a transferring guide incorporated in the image forming apparatus of the embodiment as it is in a close position;

FIG. 17 is a front view of the transferring guide as it is in a remote position;

FIG. 18 is a front view of the transferring guide as it is in an automatic loading position;

FIG. 19 is a front view depicting the transferring guide when a link system is open;

FIG. 20 is a diagram showing a link model of the transferring guide;

FIG. 22 is a block diagram of a controller for a paper slack preventing system incorporated in the image forming apparatus of the embodiment;

FIG. 23 is a time chart of the controller for the paper slack preventing system;

FIG. 24 is a characteristic diagram showing the relationship between the electric resistance inherent to the sheet and the electrostatic attraction force generated between a photosensitive drum and the sheet;

FIG. 25 is a characteristic diagram showing the relationship between temperature/humidity and the electrostatic attraction force generated between the photosensitive drum and the sheet;

FIG. 26 is a characteristic diagram showing the relationship between the transferring current and the electrostatic attraction force generated between the photosensitive drum and the sheet;

FIG. 27 is a characteristic diagram showing the relationship between the surface potential of the photosensitive drum and the electrostatic attraction force generated between the photosensitive drum and the sheet;

FIG. 28 is a characteristic diagram showing the relationship between the developing bias/the intensity of exposure and the electrostatic attraction force generated between the photosensitive drum and the sheet;

FIG. 29 is a characteristic diagram showing the relationship between the printing rate and the electrostatic attraction force generated between the photosensitive drum and the sheet;

FIG. 30 is a view showing the construction of another paper slack preventing system;

FIG. 31 is a time chart of a controller for the paper slack preventing system of FIG. 30;

FIG. 32 is a perspective view showing the entire structure of a paper folding system incorporated in the image forming apparatus of the embodiment;

FIG. 33 is a longitudinal sectional view of a principal part of the paper folding system;

FIG. 34 is a view showing the operation of the paper folding system;

FIG. 35 is a front view of another movable paper guide;

FIG. 36 is a front view of still another movable paper guide;

FIG. 37 is a longitudinal sectional view of a principal part of another paper folding system;

FIG. 39 is a longitudinal sectional view of a principal part of still another paper folding system;

DESCRIPTION OF THE PREFERRED EMBODIMENTS

Figure 1:
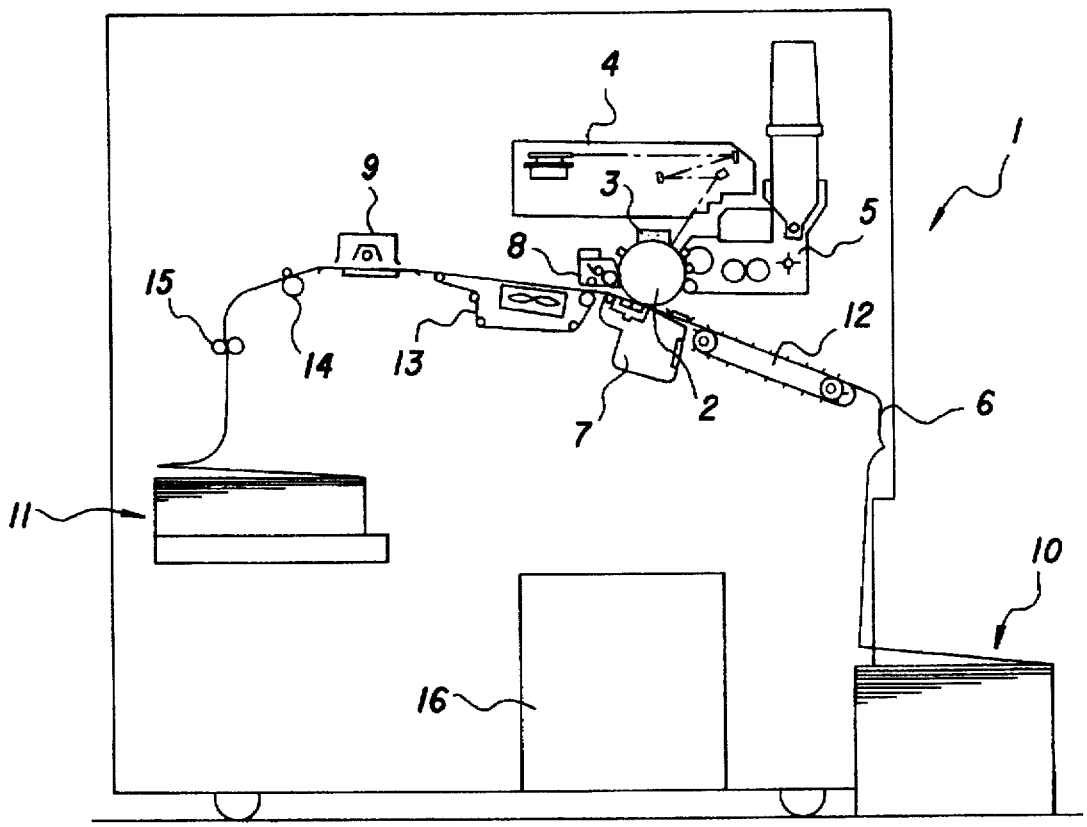

Referring now to the drawings, preferred embodiments of an image forming apparatus according to the invention will be hereinafter described.

FIG. 1 schematically shows a whole construction of an image forming apparatus according to one embodiment of the invention.

In FIG. 1, an image forming apparatus 1 is provided with a cylindrical photosensitive drum 2. A front charger 3 for uniformly charging the surface of the photosensitive drum 2 is disposed over the photosensitive drum 2 and an optical system 4 is disposed above the front charger 3 for illuminating areas except for image areas formed on the surface of the photosensitive drum 2 charged by the front charger 3, thereby forming electrostatic latent images. A developing device 5 is provided on a side of the photosensitive drum 2, for forming visible images (toner images) by adhering toner to the electrostatic latent images formed by the optical system 4, the toner being opposite to the electrostatic latent images in polarity. Disposed under the photosensitive drum 2 is a transferring device 7 for transferring the toner images formed by the developing device 5 onto a sheet (copy paper) 6 by utilizing electrostatic force. More specifically, image transferring is performed such that the sheet 6 is placed on the toner images and an electric charge, which is opposite to the toner images in polarity, is applied to the back of the sheet 6 to produce electrostatic force. A cleaning device 8 is disposed opposite to the developing device 5 with the photosensitive drum 2 between, for removing residual toner left on the photosensitive drum 2. A fixing device 9 is disposed downstream in the direction such that the photosensitive drum 2 delivers the sheet 6 in order to permanently fix, the toner images which have been transferred onto the sheet 6 by fusing.

A hopper unit 10 for supplying the sheet 6 is externally disposed on one side of the apparatus 1 while the other side is provided with a stacker unit 11 on which the sheet 6 bearing images is stacked. The sheet 6 stacked within the hopper unit 10 is drawn out by a tractor 12 housed at the other side in the apparatus 1. The sheet 6 travels between the photosensitive drum 2 and the transferring device 7 and reaches the fixing device 9 after passing a suction feeder 13. After passing the fixing device 9, the sheet 6 is then turned over and sent by discharge rollers 14 and scuff rollers 15 to the stacker unit 11 positioned below those rollers 14, 15.

Provided under the transferring device 7 in the apparatus 1 is a controller 16 for controlling the mechanical operation of the photosensitive drum 2, the tractor 12, the suction feeder 13, the fixing device 9, the discharge rollers 14 and the scuff rollers 15. This controller 16 also undertakes the control of various conditions in the electrophotographic process such as charging, exposing, developing conditions of the photosensitive drum 2 and the charging and discharging conditions of a transferring charger incorporated in the transferring device 7.

The elements of the image forming apparatus 1 having the above structural arrangement is hereinafter described in more detail.

(1) Delivery unit and its supporting system Now reference is made to FIGS. 2 to 15 for explaining a delivery unit 20 and its supporting system, the delivery unit 20 composed of the transferring device 7, the tractor 12 and the suction feeder 13. The tractor 12 is positioned in front of the transferring device 7, that is, in the upstream of the photosensitive drum 2 while the suction feeder 13 is behind the transferring device 7, that is, in the downstream of the photosensitive drum 2.

Figure 2:
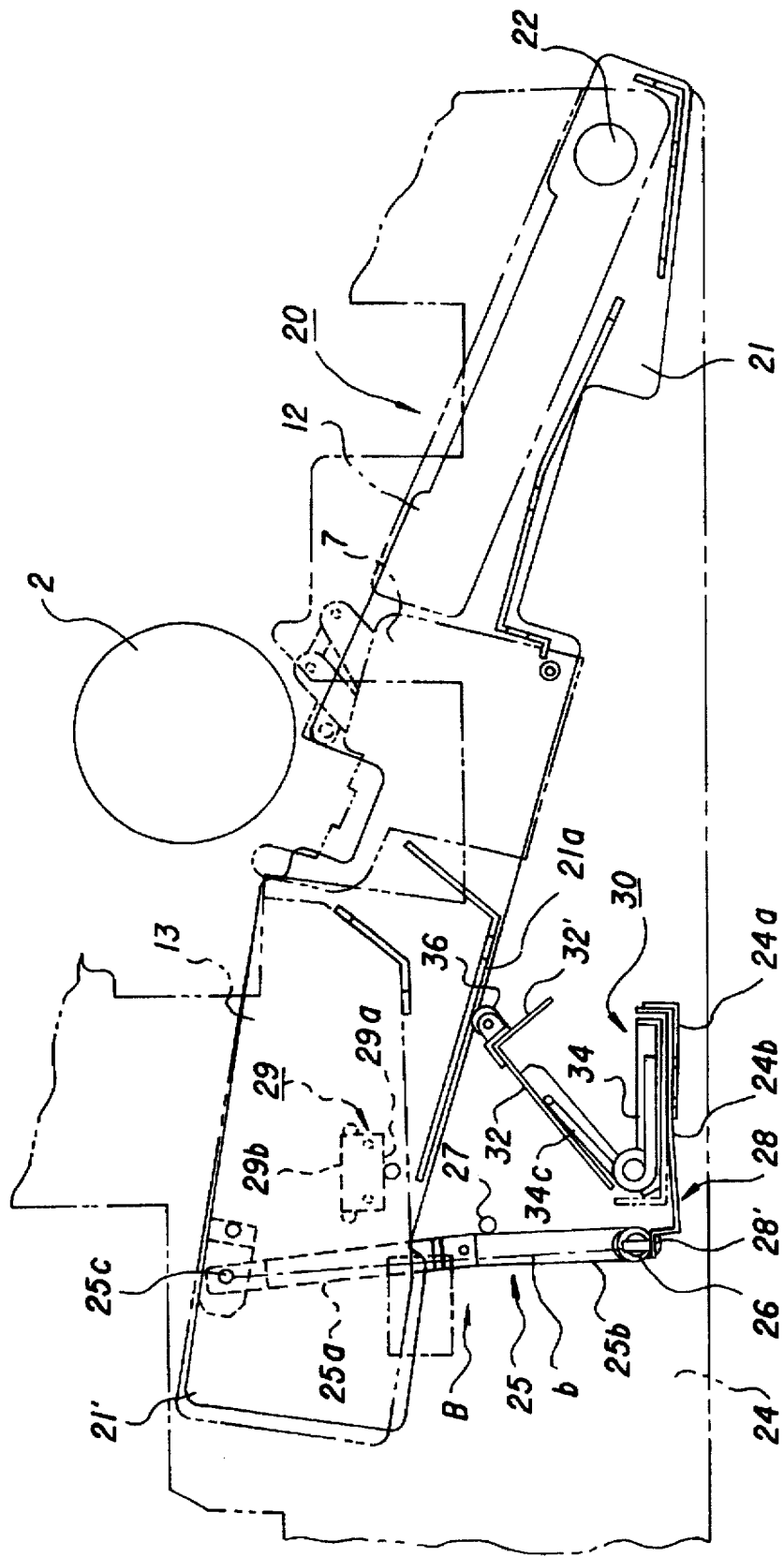

As shown in FIG. 2, the delivery unit 20 is supported on a delivery unit frame 21 which is pivotally attached to a body frame 24 at the supported end of the tractor 12 by a supporting shaft 22. The body frame 24 is provided in the exterior of the delivery unit frame 21. The delivery unit frame 21 is made up of two plates arranged in parallel with a specified spacing. Between these plates, the transferring device 7, the tractor 12 and the suction feeder 13 are coupled by a supporting member or similar devices.

At a movable part 21' opposite to the pivotally supported part of the delivery unit frame 21, a supporting link system 25 is coupled to an appropriate position, for supporting the delivery unit 20 such that it can be displaced from an operating position close to the photosensitive drum 2 to a standby position remote from the same. The supporting link system 25 includes two sets of links symmetrically arranged at both sides of the delivery unit frame 21 (see FIGS. 4 and 5), each set comprising an upper link 25a and a lower link 25b coupled to each other by an intermediate connecting pin 25d. The upper end of each of the upper links 25a is coupled to the upper part of the delivery unit frame 21 by a pin 25c. The lower ends of the lower links 25b are coupled to each other by a link fulcrum shaft 26 both ends of which are supported at the body frame 24 such that the link fulcrum shaft 26 can move up and down to a certain extent. In this example, the lower links 25b are somewhat shorter than the upper links 25a.

The supporting link system 25 is designed such that in the condition where the delivery unit frame 21 is in the operating position as shown in FIG. 2, the lower links 25b touch stoppers 27 so as to be held when the intermediate connecting pins 25d exceed a dead point line b (a straight line connecting the pin 25c and the center of the link fulcrum shaft 26) in the direction of arrow B, and such that the intermediate connecting pins 25d will not return in the direction opposite to arrow B exceeding the dead point line b unless returning operation is performed. A lateral member 24a extends in front of the link fulcrum shaft 26 (i.e., at the right of the shaft 26 in FIG. 2) within the body frame 24. Fixedly mounted on the lateral member 24a are the base ends of a plurality of fulcrum shaft supporting springs 28. The leading end 28' of each fulcrum shaft supporting spring 28 is pressed against the bottom of the link fulcrum shaft 26 so that the link fulcrum shaft 26 is constantly energized so as to move upwards.

Figure 3A:
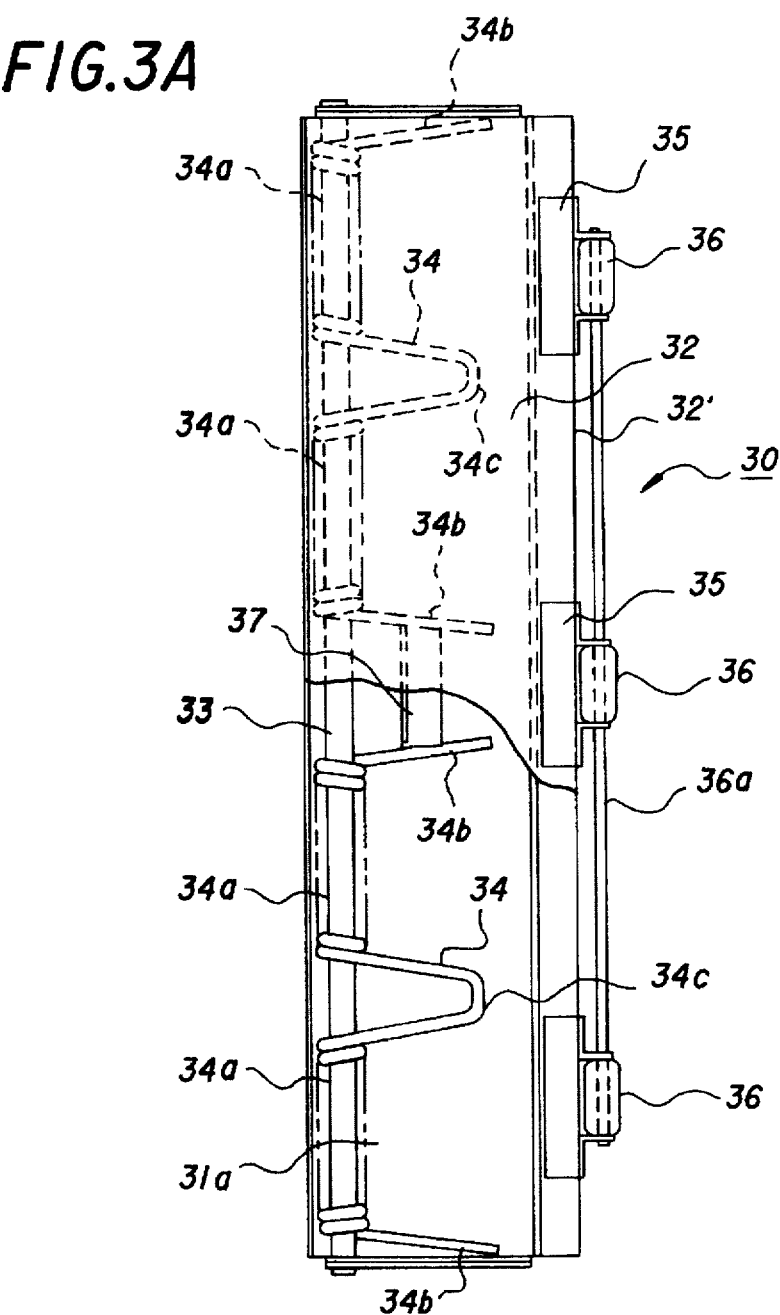
FIG. 3A is a partially cutaway plan view of a lifting means.
Figure 3B:
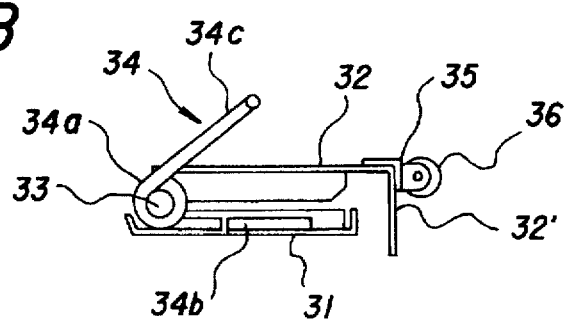
FIG. 3B is a view showing an end face of the lifting means.

A lifting means 30 is disposed above the fulcrum shaft supporting springs 28 through a lateral support member 24b mounted on the lateral member 24a. The lifting means 30 energizes the delivery unit frame 21 to rise towards the operating position. As shown in FIGS. 3A and 3B, the lifting means 30 comprises a bottom plate 31 fixed to the lateral support member 24b, a movable spring saddle 32, torsion coil springs 34 interposed between the movable spring saddle 32 and the bottom plate 31. The movable spring saddle 32 is bent at right angles at both ends, these ends being alignment in the width direction of the bottom plate 31 (i.e., the vertical direction in FIG. 3A). The bent portions of the movable spring saddle 32 are pivotally coupled to the bottom plate 31 with a shaft 33 which is disposed at one side of the bottom plate 31, extending in parallel with its width direction. The shaft 33 is fitted in a coil portion 34a (i.e., the base part) of each of the torsion coil springs 34. Movable spring portions 34b and 34c project from the coil portion 34a making an appropriate angle therebetween. The movable spring portion 34b extends along the upper face of the bottom plate 31 while the other movable spring portion 34c extends as to come in contact with the bottom face of the movable spring saddle 32, so that the movable spring saddle 32 pivots on the shaft 33 upwards. The leading end of the movable spring saddle 32 is bent down at substantially right angles to form a movable leading end 32' and is reinforced. The bent portion of the movable leading end 32' is provided with a plurality of brackets 35 spaced at suitable intervals. These brackets 35 support a shaft 36a provided with a plurality of rollers 36 (in this example, three rollers). Reference numeral 37 designates a preventing member for preventing the two torsion coil springs 34, 34 from moving along the shaft 33. In FIG. 3B, the movable spring portion 34c is shown in a free condition for the convenience of illustration.

As shown in FIG. 2, the lifting means 30 is mounted such that the movable leading end 32' of the movable spring saddle 32 is positioned opposite to the supporting shaft 22 of the delivery unit frame 21. The plurality of rollers 36 are always in contact with the bottom face of a supporting member 21a which extends under the delivery unit frame 21 in its width direction and are energized in the direction to raise the delivery unit frame 21.

Figure 4:
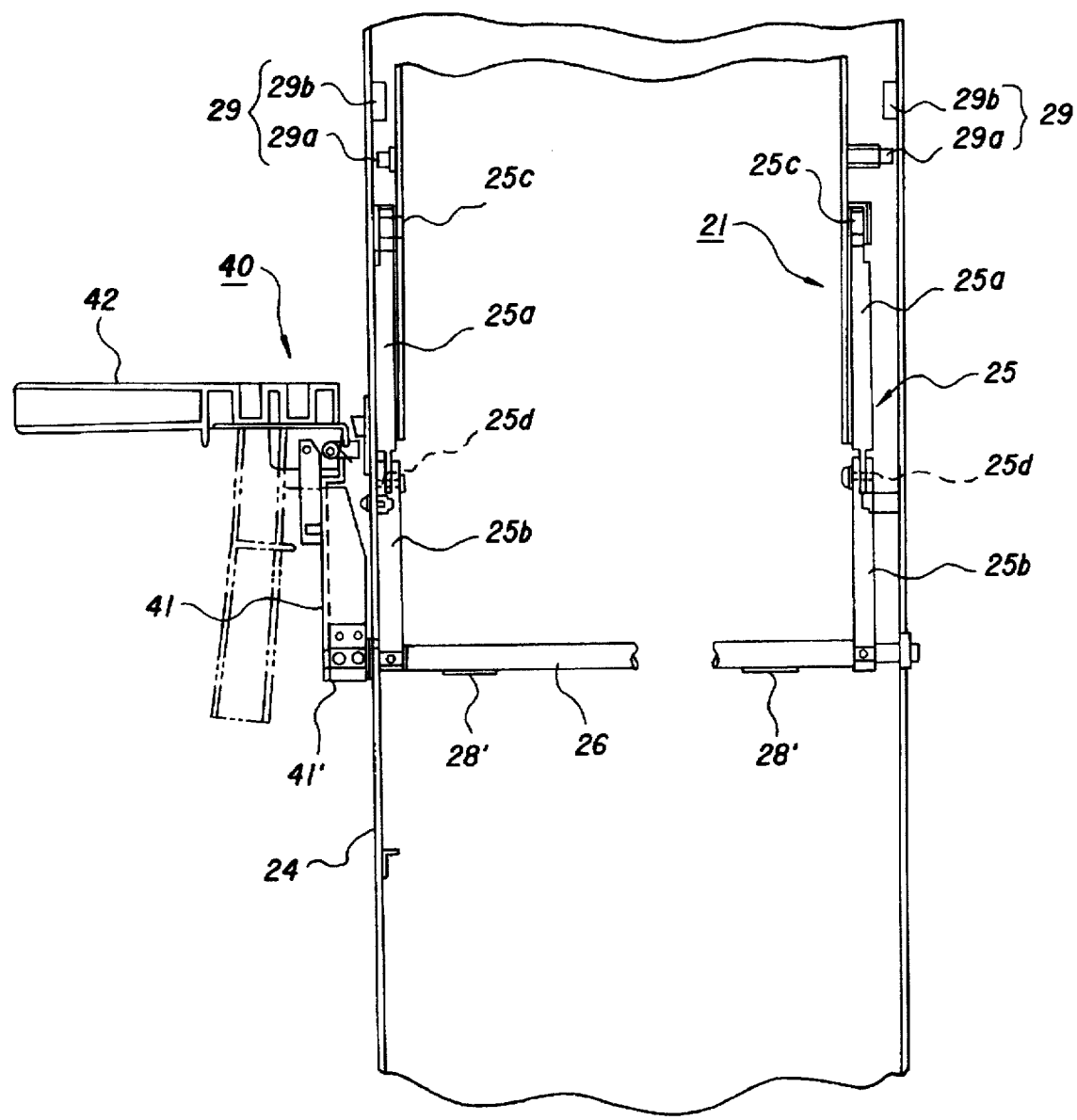
Figure 5:
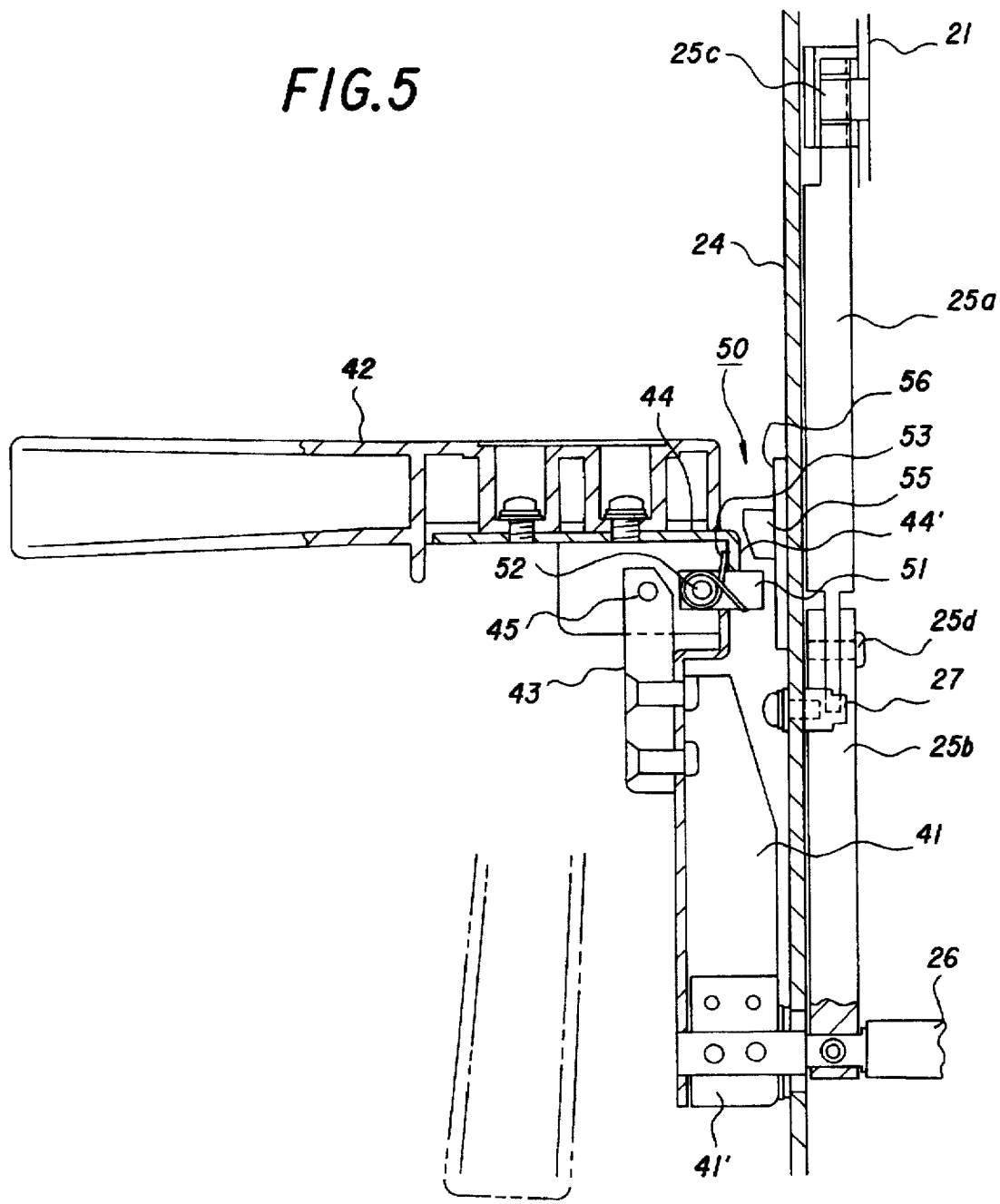
Figure 6:
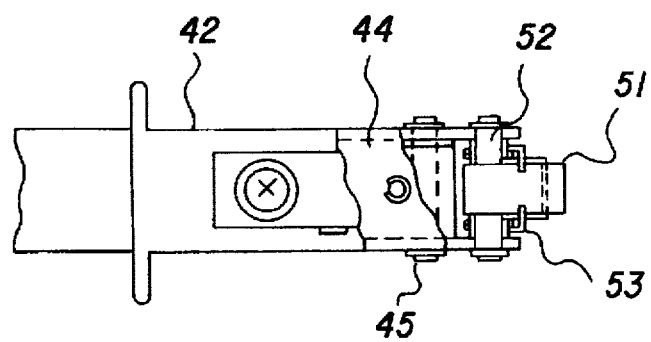

The delivery unit frame 21 is provided with a positioning means 29 for correctly placing the delivery unit frame 21 in a specified position in relation to the photosensitive drum 2 when the delivery unit frame 21 is returned from the standby position (see FIG. 11) to the operating position after once moving to the standby position which is at a specified distance under the operating position. The positioning means 29 comprises, as shown in FIGS. 2 and 4, positioning blocks 29b which are attached to the inner face of the body frame 24 respectively and positioning pins 29a which project from the respective outer faces of the plates constituting the delivery unit frame 21 and which contact with the bottom faces of the respective positioning blocks 29b. It is also possible that the positioning pins 29a are attached to the body frame 24 while the positioning blocks 29b are attached to the delivery unit frame 21.

There is provided in the apparatus 1 an operation handle system 40 for rocking the delivery unit frame 21 so as to be displaced. The operation handle system 40 comprises, as shown in FIGS. 4 to 8, a lever 41 of a specified length which has a base end 41' fixed to one end of the fulcrum shaft 26 of the supporting link system 25; a handle 42 the principal part of which is pivotally supported at the leading end of the lever 41 so that it can be raised and brought down; a releasing member 51 which includes a lock releasing means 50 and releases to release the locked condition of the supporting link system 25 at the operating position. There is provided a cam 55 attached to the body frame 24, which is opposite to the operation handle system 40. This cam 55 constitutes the fixed part of the lock releasing means 50.

As has been described above, the base end 41' of the lever 41 of the operation handle system 40 is secured to one end of the fulcrum shaft 26 outside the body frame 24, such that the longitudinal axis of the lever 41 is, for instance, in parallel with the longitudinal axis of the lower links 25b of the supporting link system 25. A supporting member 43 is secured to the leading end of the lever 41 and an inverted U-shape link 44 formed from a metal plate is pivotally attached to the upper end of the supporting member 43 with a connecting pin 45. The handle 42 is attached to the back of the leading end of the link 44.

The main part of the releasing member 51 having the lock releasing means 50 is attached to the interior of the link 44 with a shaft pin 52, with its leading end projecting from the link 44, so that the releasing member 51 pivots in a vertical direction together with the handle 42. This releasing member 51 is pivoted on the shaft pin 52 only downwards by a torsion coil spring 53 which is engaged with the shaft pin 52 and the leading end of the link 44. The releasing member 51 is kept in engagement with an engaging part 44' which is a leading end of a plate constituting the link 44 and is bent towards the releasing member 51.

Figure 7:
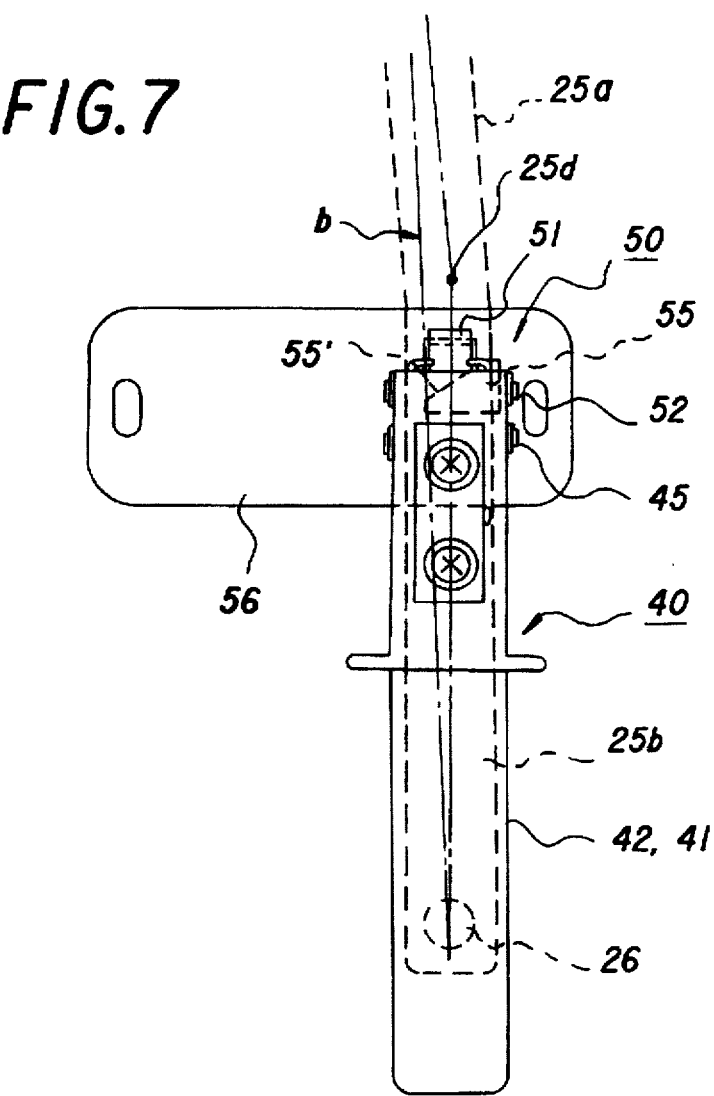

Arranged opposite to the operation handle system 40 is the fixed part of the lock releasing means 50 which is composed of the cam 55 having an inclined face 55' and secured to the outer face of the body frame 24. Specifically, the cam 55 is secured to the base plate 56 attached to the body frame 24 so as to face the releasing member 51 attached to the leading end of the handle 42. The positional relationship between the cam 55 and the operation handle system 40 is shown in FIG. 7. When the delivery unit frame 21 is set in the operating position, the operation handle system 40 is folded so as to be parallel with the lever 41 by operating the handle 42 to pivot on the connecting pin 45 downwardly. In this condition, the releasing member 51 attached to the leading end of the handle 42 faces up in front of the cam 55 without touching it.

When the delivery unit 20 with the above described arrangement is in the operating position (see FIG. 2), the intermediate connecting pins 25d each connecting the upper link 25a and the lower link 25b of the supporting link system 25 are at the right hand of the dead point line b in FIG. 2 and the lower links 25b are held by the stoppers 27 &t the side faces thereof, so that the delivery unit frame 21 is kept and locked at the operating position. At such time, the operation handle system 40 is in the condition as shown in FIGS. 7 and 8 and the releasing member 51 attached to the operation handle system 40 faces up so that there is no likelihood that the delivery unit frame 21 will be displaced.

In order to move the delivery unit 20 in the above condition from the operating position to the standby position (see FIG. 11) so as to clean the surrounding area of the photosensitive drum 2 or remove a jammed sheet, the handle 42 of the operation handle system 40 is gripped and pulled up forwards, i.e., in the direction of arrow c and then pivoted in the direction of arrow d with the handle 42 continuously being gripped (see FIG. 9). In this operation, when the handle 42 is pulled up forwards, the handle 42 pivots on the connecting pin 45 by which the handle 42 is connected to the lever 41, and the releasing member 51, which is supported by the link 44 at the leading end of the handle 42, pivots concomitantly with the pivot of the handle 42. Thereafter, the releasing member 51 moves down into engagement with the inclined face 55' of the cam 55 which is attached to the body frame 24 in an opposed position. When the releasing member 51 pivots in the direction of arrow c as shown in FIGS. 10A and 10B, it initially comes in contact with the upper part of the inclined face 55' of the cam 55. The releasing member 51 is then forcibly moved down to the left being guided by the inclined face 55', as the pivotal displacement proceeds as indicated by the two-dot chain line. Consequently, the lever 41 is pivotally displaced in an instant from the position shown in FIG. 7 to the position shown in FIG. 14 about the time when the handle 42 is laid horizontally. Accordingly, the lever 41 momentarily forces down the fulcrum shaft 26 to which the lever 41 is connected at the base end 41', overcoming the lifting force of the fulcrum shaft supporting springs 28, so that the intermediate connecting pins 25d each connecting the upper link 25a and the lower link 25b move to the left in FIG. 2, beyond the dead point line b.

Figure 11:
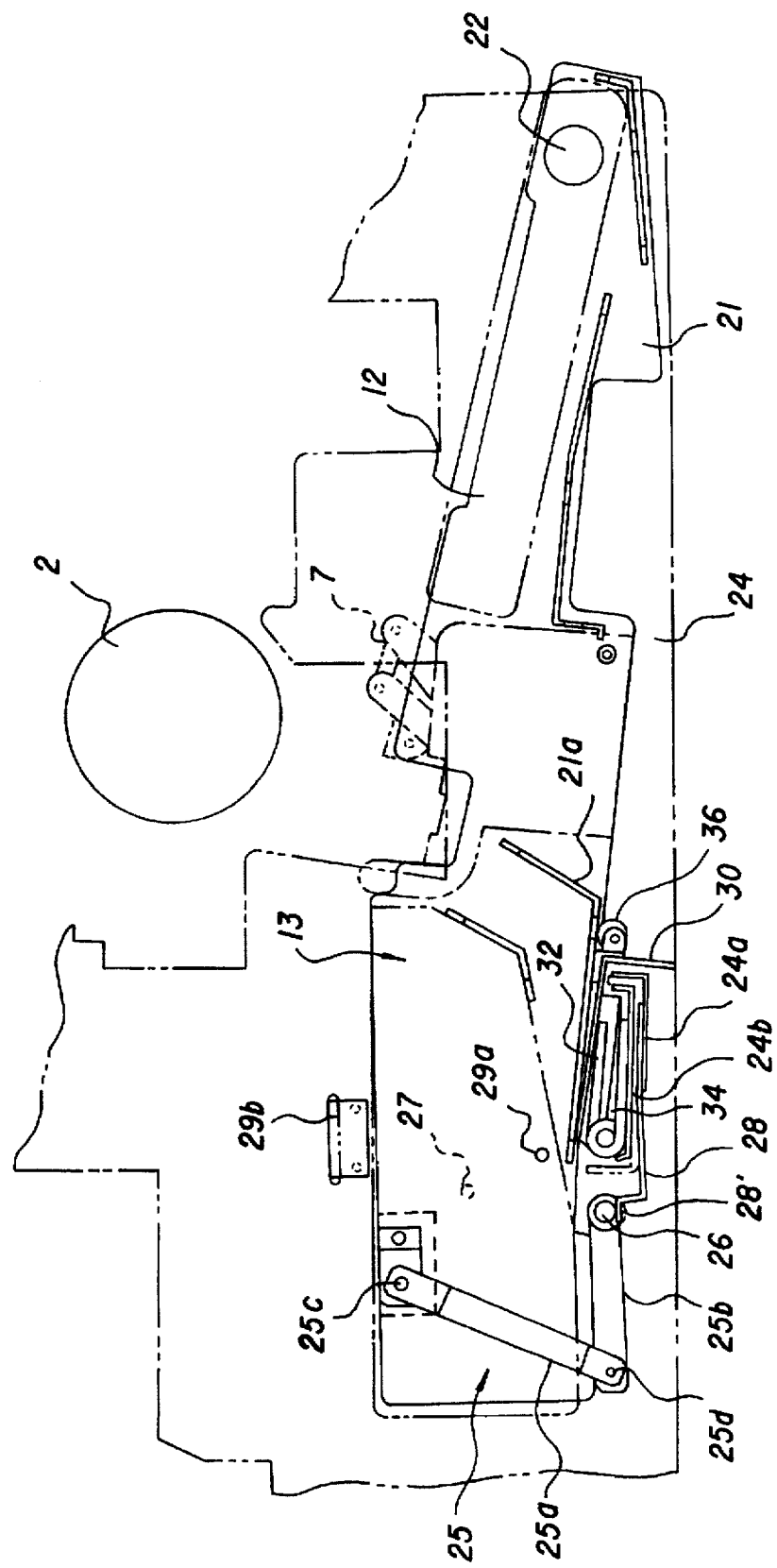

When the operator operates the handle 42 so as to pivot in the direction of arrow d as shown in FIG. 9, the delivery unit 20 is displaced to the standby position by its own weight, following the pivotal movement of the lever 41 which concomitantly takes place with the pivot of the handle 42. During the displacement to the standby position, the delivery unit frame 21 is constantly energized by the torsion coil springs 34 of the lifting means 30 in the direction that it rises, and therefore, it can be displaced without abruptly moving downward. At the time when the delivery unit 20 reaches the standby position, the supporting link system 25 and the lifting means 30 are both brought to their folded states as shown in FIG. 11, and their loads acting on the delivery unit 20 allows the unit 20 to be kept at the standby position.

In order to return the delivery unit 20 to the operating position after completion of cleaning or removing a jammed sheet, the operation handle system 40 is operated reversely to the above direction. The returning operation of the delivery unit 20 to tile operating position will be described below.

Figure 12:
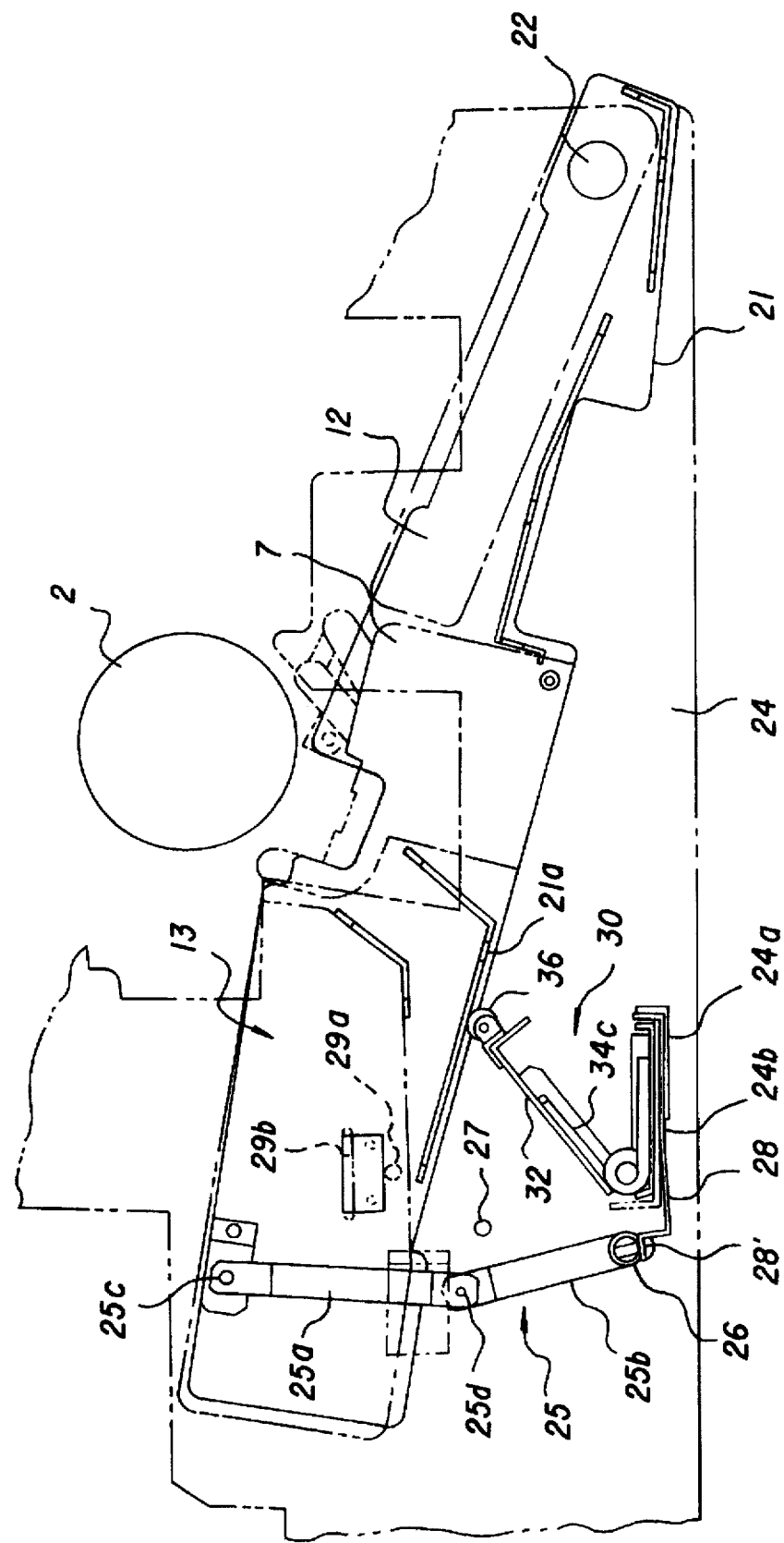
Figure 13:
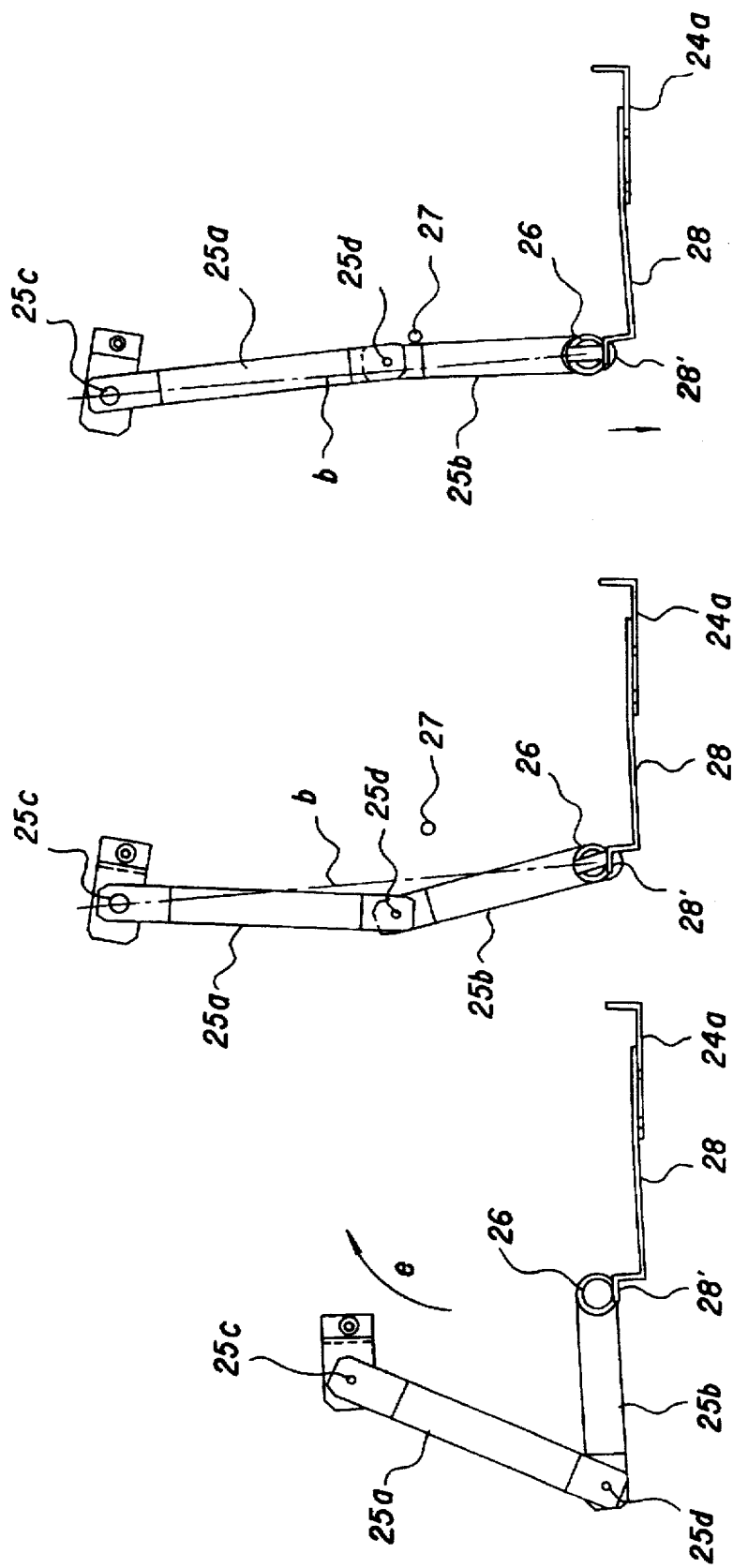

For returning the delivery unit 20 to the operating position, the handle 42 of the operation handle system 40 is gripped and operated to pivot in the direction opposite to the arrow d in FIG. 9. This movement is transmitted to the fulcrum shaft 26 of the supporting link system 25 by the lever 41 of the operation handle system 40, causing the upper links 25a and the lower links 25b to pivot on the fulcrum shaft 26 in the direction of arrow e. Thus, the upper links 25a and the lower links 25b a are displaced from the condition shown in FIG. 13A and raised. The rise of the supporting link system 25 allows the delivery unit frame 21 coupled to the upper links 25a by the connecting pins 25c to pivot on the supporting shaft 22 and move towards the operating position. After the upper links 25a and lower links 25b of the supporting link system 25 have been displaced to the position shown in FIG. 13B, the positioning pins 29a attached to the delivery unit frame 21 respectively come in contact with the positioning blocks 29b attached to the body frame 24, thereby preventing the further rising of the delivery unit frame 21. Specifically, the contact of the positioning blocks 29b with the positioning pins 29a allows the delivery unit 20 to be set in a specified position in relation to the photosensitive drum 2 as shown in FIG. 12. During such time, the torsion coil springs 34 of the lifting means 30 energize the delivery unit frame 21 in its rising direction with the help of the rollers 36 which move turning on the bottom face of the supporting member 21a. This arrangement makes it possible to easily lift the delivery unit frame 21 without applying a great force to the handle 42.

However, in the above condition, the supporting link system 25 is positioned in front of the dead point line b as shown in FIG. 13B. This means that the delivery unit 20 is put in an unstable condition if the lifting operation by the operation handle system 40 is stopped. By moving the handle 42 further to the right with force, the intermediate connecting pins 25d each connecting the upper link 25a and the lower link 25b can be moved to exceed the dead point line b and the lower links 25b an be brought into contact with the stoppers 27 as shown in FIG. 13c. Thus, the supporting link system 25 can be brought in a condition where the system 25 steadily supports the delivery unit 20; i.e., the delivery unit 20 can be set in the operating position (see FIG. 2). After reaching the specified position shown in FIG. 12, the delivery frame unit 21 stays there and only the supporting link system 25 is later displaced. When the supporting link system 25 is moved to a locked position (where the lower links 25b are in contact with the stoppers 27), the fulcrum shaft 26 is momentarily pressed down against the supporting force of the fulcrum shaft supporting springs 28, exceeding the dead point line b so that the operator operating the handle 42 receives a "clicking" and thus confirms that the delivery unit 20 has been locked at the operating position. When the operation handle system 40 is returned to its home position, the releasing member 51 of the lock releasing means 50 positioned at the leading end of the handle 42 passes under the cam 55 attached to the body frame 24 without touching the cam 55.

After the delivery unit 20 has been accordingly set in the operating position, the handle 42 of the operation handle system 40 is folded, thereby preventing erroneous operation. The handle 42 is moved along the lever 41 from its horizontal condition to pivot down (in the direction opposite to arrow c in FIG. 9) about the connecting pin 45, so that the releasing member 51 firstly pivots upwards following the pivotal movement of the handle 42 and then comes in contact with the cam 55. Consequently that, the releasing member 51 pivots downwards and then moves up being released from the contact to return to the initial position. The displacement of the releasing member 51 is performed as illustrated in FIG. 15, starting from the condition shown in the rightmost figure. The displacement will be explained in more detail with reference to FIG. 15. Immediately before the lever 42 (not shown in FIG. 15) reaches its accommodated position with the handle 42 (not shown in FIG. 15) being in its horizontal condition, the releasing member 51 is also horizontally positioned under the cam 55. Such is the case because the releasing member 51 is attached to the link 44 positioned at the leading end of the handle 42, with the torsion coil spring 53 interposed therebetween, such that the releasing member 51 can be pivoted on the shaft pin 52 in the downward direction only (FIG. 15(i)). At the time when the lever 41 reaches the accommodated position, the lifting force of the fulcrum shaft supporting springs 28 pushes the releasing member 51 towards the bottom face of the cam 55 (FIG. 15(ii)). When forcing the handle 42 down afterwards, the releasing member 51 is displaced upwards and then comes in contact with the bottom face of the cam 55 (FIG. 15(iii)). When forcing the handle 42 further down, the releasing member 51 is pressed by the cam 55 so as to pivot downwards in inverse proportion to the pivotal movement of the handle 42 (FIG. 15(iv)). When the rotation angle of the handle 42 becomes greater, the shaft pin 52 of the releasing pin 51 takes a higher position with respect to the connecting pin 45 connecting the lever 41 and the handle 42, and therefore, the shaft pin 52 is gradually parted from the contact point at which the releasing member 51 is in contact with the cam 55. Thereafter, the releasing member 51 is flipped upwards by the energizing force of the torsion coil spring 53 so that it is completely disconnected from the cam 55 (FIG. 15(v)). As a result, the releasing member 51 is displaced in the upward direction from the position indicated by the chain line f as shown in Figure 15(vi) and the handle 42 is folded as shown in FIG. 8.

In a condition where the handle 42 of the operation handle system 40 is folded in parallel with the lever 41, the supporting link system 25 supporting the delivery unit frame 21 is kept at a position exceeding the dead point line b as already mentioned and thus the delivery unit 20 is not moved out of the specified operating position during the operation of the image forming apparatus 1.

In this embodiment, since the movable end of each torsion coil spring 34 Functioning as the lifting means 30 for lifting the delivery unit 20 to the operating position faces the supporting shaft 22 of the delivery unit frame 21, only a small operating force is needed for shifting the delivery unit 20 between the operating position and the standby position. In comparing the above embodiment with the case where the torsion coil springs are oriented in the opposite direction to that of the embodiment, torque exerted on the handle 42 when the delivery unit frame 21 is shifted from the standby position to the operating position by the operation handle system 40 is substantially uniform in the embodiment. On the other hand, in the case where the orientation of the torsion coil springs 34 is reversed, torque exerted on the handle 42 is not uniform. It has been found that the torque in the above case which is undesirable; irregularly varies, which is undesirable; that is it gradually increases as the delivery unit frame 21 is moved to the operating position and abruptly decreases when the frame 21 is very close to the final position.

(2) Transferring guide

With reference to FIGS. 16 to 21B, a transferring guide 61 constituting a part of the transferring unit 7 will be hereinafter described.

As shown in FIGS. 16 to 19, the transferring guide 61 of this embodiment is formed as one unit within a prismatic frame 62. The frame 62 is arranged under the photosensitive drum 2, extending in parallel with an axial direction of the photosensitive drum 2. The transferring guide 61 extends in parallel with a longitudinal direction of the frame 62 and includes a fixed shaft 63 pivotally supported in the rear of the frame 62. A pair of lower guide blocks 64, 64 are secured to both ends of the fixed shaft 63 such that they extend from the fixed shaft 63 towards the photosensitive drum 2. Spanned over the pair of lower guide blocks 64, 64 is a lower guide 65 which is formed from a plate having a substantially same length as the frame 62. The lower guide 65 is bent down at right angles at the end closer to the photosensitive drum 2 and the end remote from the photosensitive drum 2 is bent down at an obtuse angle.

The lower guide blocks 64, 64 are respectively provided with a pair of first coupling arms 66, 66 the lower ends of which are secured to positions somewhat closer to the respective rear ends of the lower guide blocks 64, 64. The first coupling arms 66, 66 are somewhat inclining to a direction opposite to the sheet delivery direction. The upper ends of the first coupling arms 66, 66 are pivotally supported at the rear ends of a pair of upper guide blocks 67, 67 by means of pins 68, 68 respectively. The upper guide blocks 67, 67 extend towards the photosensitive drum 2 and under these guide blocks 67, 67, an upper guide 69 spans. The upper guide 69 is formed from a plate, and its length running in parallel with an axial direction of the photosensitive drum 2 is equal to that of the lower guide 65 while its width running in parallel with the delivery direction of the sheet 6 is narrower than that of the lower guide 65. The upper guide 69 is bent up at an obtuse angle at the end closer to the photosensitive drum 2 and at right angles at the end remote from the photosensitive drum 2.

Figure 20:
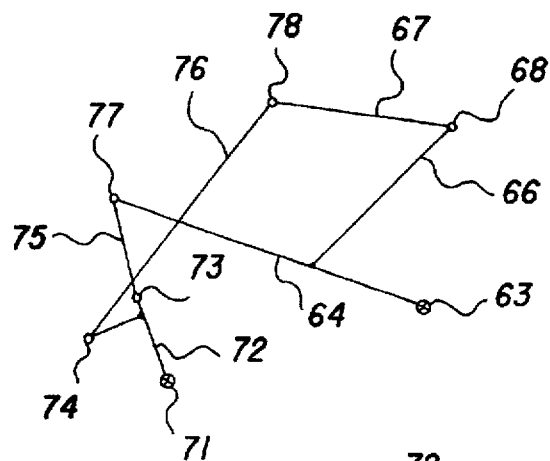

The frame 62 is provided with a driving shaft 71 pivotally supported thereby. The driving shaft 71 extends in parallel with the fixed shaft 63 in a position somewhat lower than and in front of the fixed shaft 63 and is driven by a stepping motor 70. There are disposed a pair of substantially L-shaped rocking levers 72, 72. One end of each rocking lever 72, 72 is secured to both ends of the driving shaft 71. The other end of each rocking lever 72, 72 is provided with a second coupling arm 75, 75 and a third coupling arm 76, 76 pivotally supported at their lower ends to the rocking levers with pins 73, 73 and 74, 74 respectively. The pins 73, 73 and 74, 74 are so arranged that they are substantially equidistant from the driving shaft 71 and their pivoting angles on the driving shaft 71 are shifted from each other by an angle α. The second coupling arms 75, 75 are shorter than the third coupling arms 76, 76. The respective upper ends of the second coupling arms 75, 75 are pivotally supported at the respective front ends of the lower guide blocks 64, 64 by means of pins 77, 77. The respective upper ends of the third coupling arms 76, 76 are pivotally supported at the respective front ends of the upper guide blocks 67, 67 by means of pins 78, 78. In front of the transferring guide 61 described above, a transferring charger 79 is disposed removably. FIG. 20 schematically illustrates a link model representing the mechanism of the transferring guide 61.

The operation of the transferring guide 61 is hereinafter explained.

Figure 17:
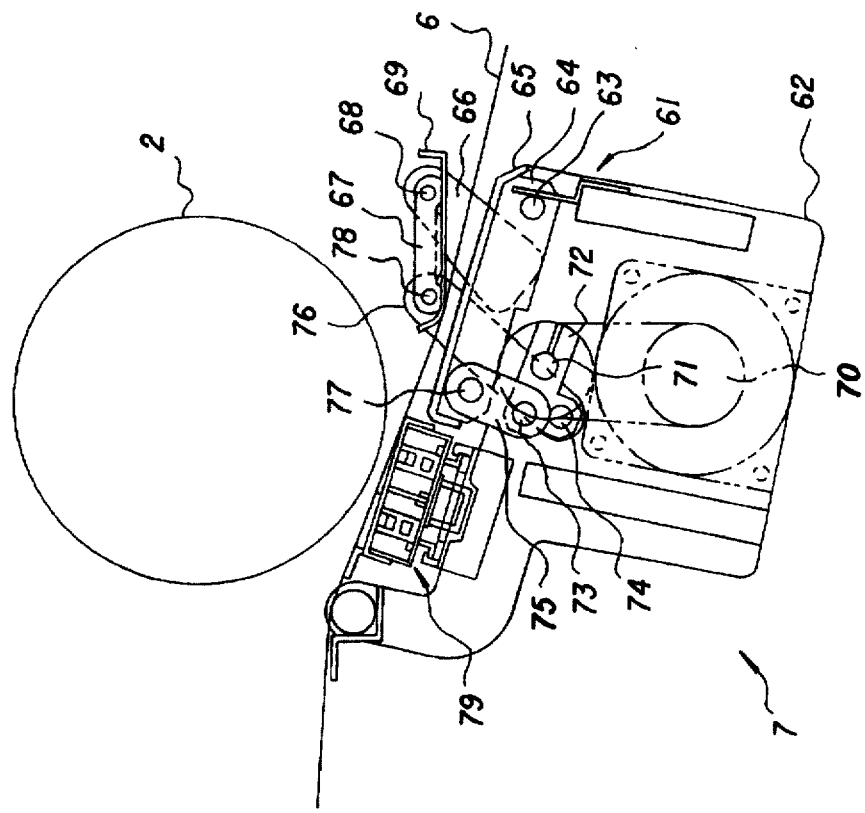
Figure 16:
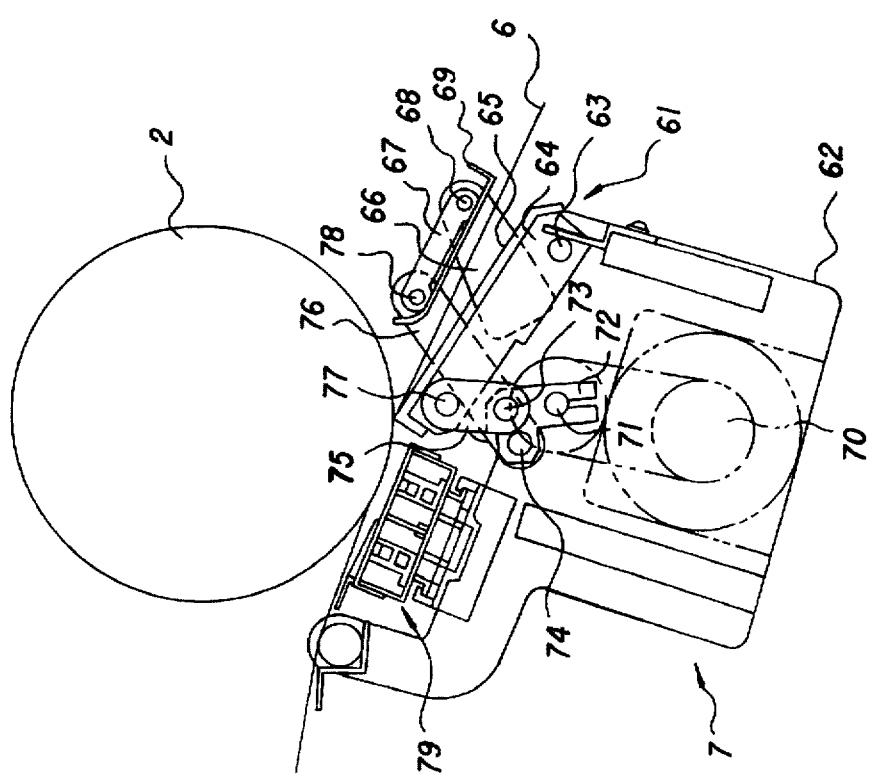

The transferring guide 61 of this embodiment takes three positions, which are (i) a close position where the sheet 6 is close to the photosensitive drum 2 and the front ends of the lower guide 65 and the upper guide 69 are in their respective uppermost positions after pivoting as shown in FIG. 16; (ii) a remote position where the sheet 6 is remote from the photosensitive drum 2 and the front ends of the lower guide 65 and the upper guide 69 are in their respective lowermost positions after pivoting as shown in FIG. 17; and (iii) an automatic loading position situated substantially midway between the close position and the remote position as shown in FIG. 18, where the sheet 6 is automatically loaded.

Firstly, with the transferring guide 61 being kept at the automatic loading position (FIG. 18), the tractor 12 and the suction feeder 13 (see FIG. 1) are driven such that the sheet (continuous form) 6 is guided and interposed between the lower guide 65 and the upper guide 69 by automatic loading. The sheet 6 is then automatically delivered to the stacker unit 11 downstream of the fixing device 9, which is in slight contact with the photosensitive drum 2, the lower guide 65 and the upper guide 69.

Figure 18:
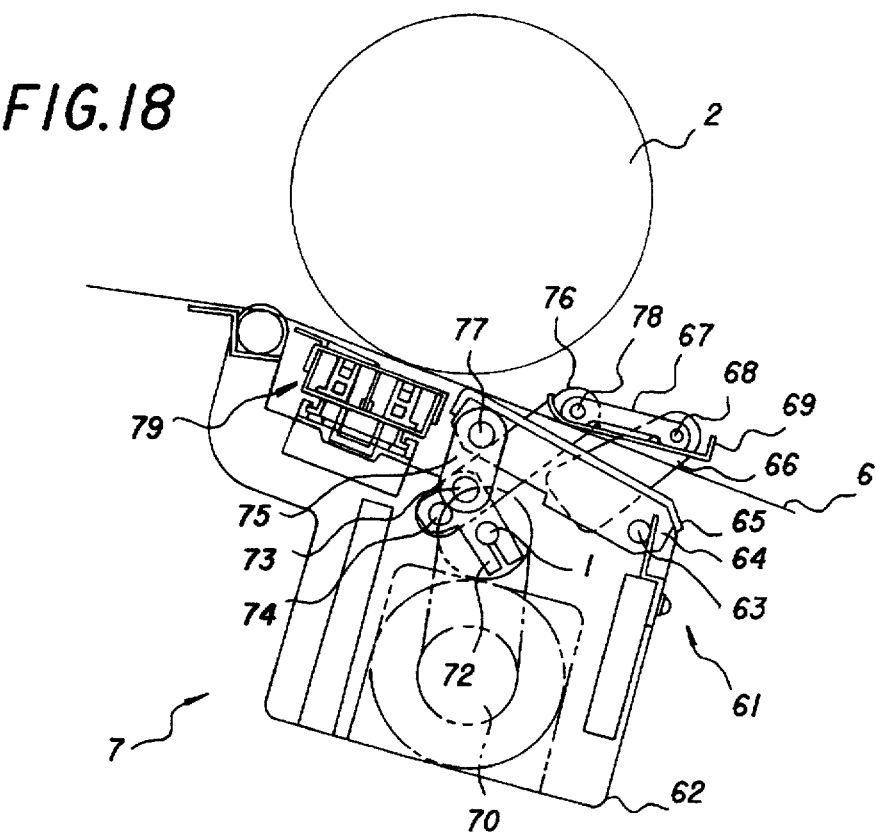
Figure 19:
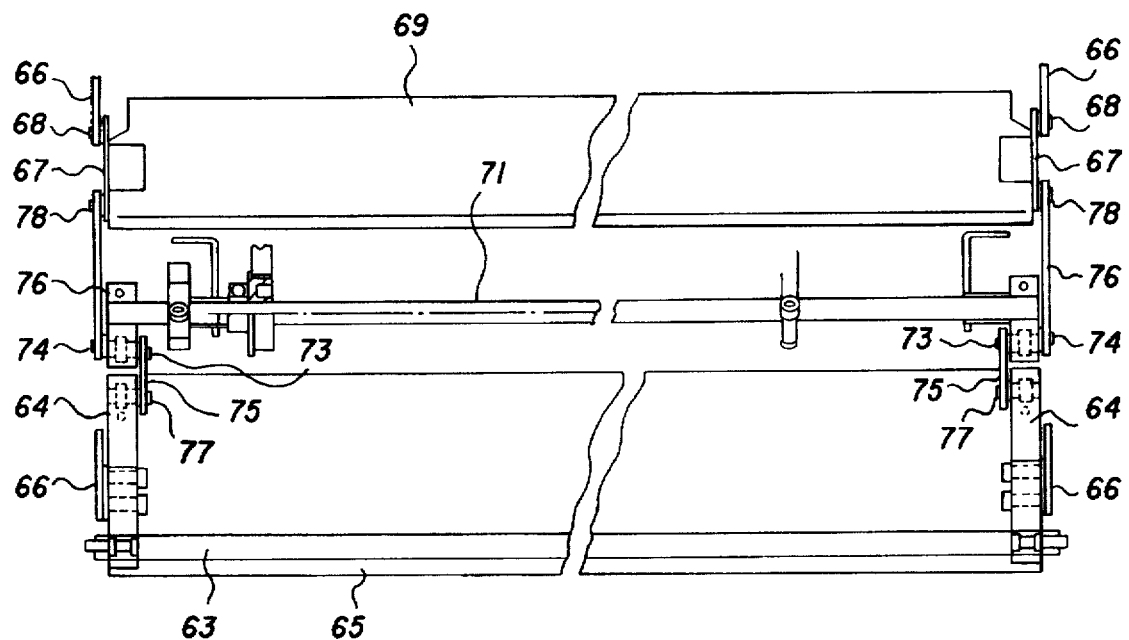

If an instruction to start transferring is given in the above condition, the driving shaft 71 is rotated to the right in FIG. 18 by the stepping motor 70, thereby rotating the pair of rocking levers 72, 72 to the right. Thereafter, the second coupling arms 75, 75 and the third coupling arms 76, 76 which are pivotally supported at the other ends of the rocking levers 72, 72 respectively, move upwards so that the sheet 6 is pressed from the underside by the front end of the lower guide 65 and moved to the close position where it is in a close contact with the photosensitive drum 2 (see FIG. 16). Thus, toner images formed on the surface of the photosensitive drum 2 is electrically attracted by the transferring charger 79 provided in front of the transferring guide 61 and transferred onto the sheet 6.

If the delivery of the sheet 6 is suspended during the above-described image transferring operation, the driving shaft 71 is synchronously rotated to the left in FIG. 16 so that the second coupling arms 75, 75 and the third coupling arms 76, 76 are moved down in the manner reverse to the above description. Then, the sheet 6 is pressed by the front end of the upper guide 69 from above towards the remote position where it is kept away from the photosensitive drum 2 (see FIG. 17).

Figure 21A:
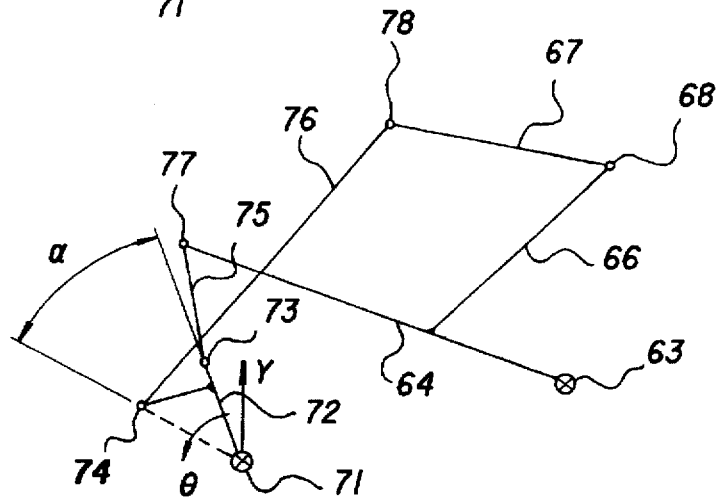
FIGS. 21A and 21B show the difference between the operation speed of an upper guide and that of a lower guide in the transferring guide.
Figure 21B:
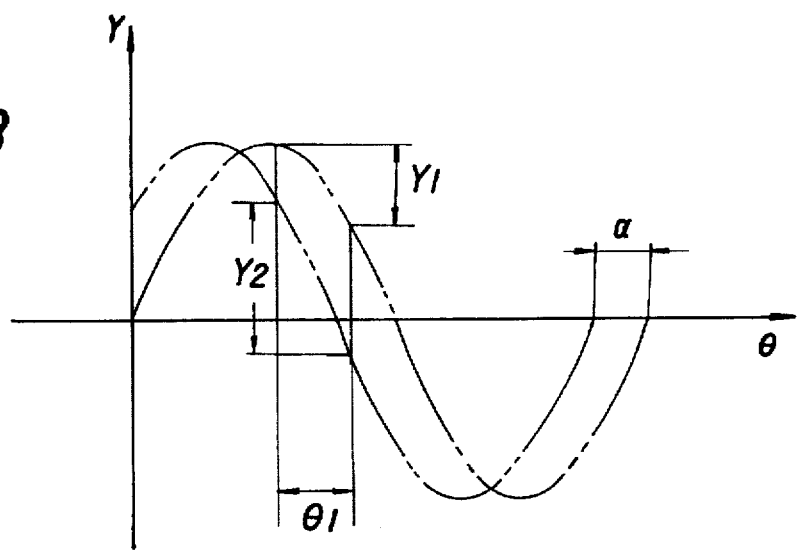

FIGS. 21A and 21B are for explaining the action of the pins 73 and 74 when the lower guide 65 and the upper guide 69 are in rocking operation. For convenience, the following description is based on the pin 73, 73 and pin 74, 74 on one side. As shown in the drawings, the pins 73, 73 and 74, 74 pivotally connecting the lower end of the second coupling arm 75, 75 and that of the third coupling arm 76, 76 respectively, are shifted from each other by the angle α with respect to the driving shaft 71, and therefore the moving amounts Y of the pins 73, 73 and 74, 74 in a vertical direction are represented by the sine curves shown in FIG. 21B. These sine curves are represented in relation to the rocking angle θ of the rocking lever 72, 72. The moving amount $Y_1$ of the pin 73, 73 and the moving amount $Y_2$ of the pin 74, 74 in relation to the specified rocking angle $θ_1$ of the rocking lever 72, 72 differ from each other (i.e., $Y_2>Y_1$) and the third coupling arm 76, 76 operates at a faster speed than that of the second coupling arm 75, 75. With the link system of this embodiment, when the sheet 6 travels from the close position to the remote position, the upper guide 69 can be lowered faster than the lower guide 65, thereby promptly separating the sheet 6 from the photosensitive drum 2.

According to the embodiment, since the sheet 6 is guided to pass between the lower guide 65 and the upper guide 69 and the rocking movement of these guides 65, 69 allows the sheet 6 to take the close position, the remote position and the automatic loading position, the paper delivery path can be made substantially straight and the reliability of the apparatus can be increased without employing a special automatic loading system. Further, the lower guide 65 and the upper guide 69 can be positively stopped at the three positions by rotating the driving shaft 71 with the stepping motor 70 as described above.

Since the transferring guide 61 is designed such that the upper guide 69 is lowered faster than the lower guide 65, the following advantage can be achieved. In the event that transferring of images onto the sheet 6 is suspended once, for example, when a perforation formed on the sheet 6 comes to a specified position and then the next cycle of image transferring is restarted from the suspended position. In such a case, before the suspension, the sheet 6 is usually delivered excessively after the perforation has passed the specified position, and then, the sheet 6 is sent back as far as the perforation passes the specified position again. This ensures that image formation is positively performed before the suspension and after the restart. According to the embodiment, since the separation of the sheet 6 from the photosensitive drum 2 can be performed very quickly after the delivery of the sheet 6 has been stopped, the above-described undesirable, useless delivery of the sheet 6 in the forward and reverse directions can be avoided, thereby increasing the reliability of the apparatus.

A further advantage of the transferring guide 61 is that since it is formed as one unit within the frame 62, maintenance can be easily performed by simply replacing the unit. Further, the transferring guide 61 of the embodiment is advantageously provided with less link arms compared with conventional ones, which simplifies the structure of the transferring guide 61.

(3) Paper slack preventing system

Reference is now made to FIGS. 22 to 29 for explaining the paper slack preventing system for preventing the slack of the sheet 6 which occurs in the downstream of the photosensitive drum 2, in order to avoid the damage of images and blurs on the sheet 6.

FIG. 22 shows, in block form, the controller 16 (see FIG. 1) in connection with other systems. As shown in the drawing, the controller 16 is provided with a central processing unit (CPU) 81 for executing predetermined programs. The CPU 81 receives the output of a temperature sensor St for detecting the temperature in the apparatus through an A/D convertor 82, and receives the output of a humidity sensor Sw for detecting the humidity in the apparatus, through an A/D convertor 83. The surface potential of the photosensitive drum 2 is detected by a surface potential sensor Sv and the information is sent to the CPU 81 through an A/D convertor 84. A video circuit 85 sends the number of dots (the number of dots per page) used for calculating the printing rate to the CPU 81 through a counter 86 and an I/O register 87. A mechanical controller disposed above the controller 16 sends information on transferring current flowing in the transferring charger 79, the bias voltage of the developing device 5 and the exposure intensity of an exposure source 88 to the CPU 81 through a bus 89. The thickness of the sheet to be stacked is specified by a paper quantity switching button Sm and this button Sm sends information on the thickness to the CPU 81 through an I/O register 90. The CPU 81 calculates the printing rate from the number of dots and the present paper attraction force of the photosensitive drum 2 (described later) in accordance with the information input from the above respective sensors.

The controller 16 is provided with a memory 91 housed therein, for storing time information necessary for starting printing operation such as time $t_1$ required after a start-up of the photosensitive drum 2 until actuation of the tractor 12 (see FIG. 23). For example, three values set in accordance with the paper attraction force of the photosensitive drum 2 are stored as the time $t_1$ in the memory 91. The memory 91 also stores time information necessary for controlling the suspension of printing operation such as time $t_2$ (see FIG. 23) required after the tractor 12 has been stopped at the time of suspension of printing until the discharge rollers 14 and the scuff rollers 15, which are delivery means in the downstream of the photosensitive drum 2, are stopped.

In the above structural arrangement, the photosensitive drum 2, the discharge rollers 14 and the scuff rollers 15, which are downstream paper delivery means, and the tractor 12, the transferring charger 79 and the transferring guide 61, which are upstream paper delivery means are controlled by the controller in the manner hereinafter described.

At the time of a start-up of the apparatus, the mechanical controller releases a start-up instruction through the bus 89. Then, the CPU 81 sets, as shown in FIG. 23, an operation flag "1" in both of an I/O register 92 for the photosensitive drum 2 and an I/O register 93 for the downstream paper delivery means, while actuating a motor 96 for the photosensitive drum 2 and a motor 97 for the downstream paper delivery means through motor drivers 94 and 95 so that the photosensitive drum 2, the discharge rollers 14 and the scuff rollers 15 are actuated (FIGS. 23(a) and 23(d)).

After an elapse of the specified time $_1$ (e.g., 5 seconds) stored in the memory 91, the CPU 81 sets an operation flag "1" in an I/O register 98 for the tractor 12 and drives a motor 100 for the tractor 12 through a motor driver 99, thereby actuating the tractor 12 (FIG. 23(c)). Simultaneous with the actuation of the tractor 12, the CPU 81 sets an operation flag "1" in an I/O register 101 associated with the transferring guide 61, driving the motor (stepping motor) 70 for the transferring guide 61 through a motor driver 102 and sets an operation flag "1" in an I/O register 103 associated with the transferring charger 79, thereby actuating the transferring charger 79.

In the above embodiment, since the discharge rollers 14 and the scuff rollers 15 are actuated simultaneous with the start of the photosensitive drum 2 is started as described above, tension is given to the sheet 6 at the start of printing so that the contact of the sheet 6 with the photosensitive drum 2 can be avoided until the transferring guide 61 is lifted. This prevents the damage of unfixed images on the sheet 6 positioned between the photosensitive drum 2 and the fixing device 9 and the production of blurs on the sheet when a paper jam occurs, such unfixed images having been transferred onto the sheet 6 before the stop of the apparatus.

Although the tractor 12, the photosensitive drum 2, the discharge rollers 14 and the scuff rollers 15 are continuously driven during printing, the circumferential speed of the discharge rollers 14 is faster than that of the tractor 12 by 3 to 5%, and the circumferential speed of the scuff rollers 15 is faster than that of the tractor 12 by 10 to 20% so that appropriate tension can be given to the sheet 6.

When the apparatus is suspended, the mechanical controller 89 releases an instruction through the bus 89 and the exposure source 88 stops emitting laser light (FIG. 23(a)). After time $t_{11}$ has elapsed after the termination of illumination, the CPU 81 unsets the operation flag "1" in the I/O register 98 for the tractor 12, thereby stopping the tractor 12 (FIG. 23(c)). At the same time, the CPU 81 unsets the operation flag "1" in the I/O register 101 for the transferring guide 61, thereby stopping the motor 70 for the transferring guide 61 and unsets the operation flag "1" in the I/O register 103 for the transferring charger 79, thereby interrupting the flow of current to the transferring charger 79 (FIG. 23(b)). After an elapse of the time $t_2$ (3 to 5 seconds) which corresponds to the present paper attraction force and is stored in the memory 91, the operation flag in the I/O register 93 for the discharge rollers 14 and the scuff rollers 15 is unset, thereby stopping the rollers 14 and 15 (FIG. 23(d)).

Since the discharge rollers 14 and the scuff rollers are continuously driven for a specified time after the stop of the tractor 12, the sheet 6 receives tension and can be moved, being separated from the photosensitive drum 2, to a plane which is in parallel with the plane tangent to the photosensitive drum 2 and where the sheet 6 was positioned before the start of printing. Such structural arrangement prevents the contact of the sheet 6 with the photosensitive drum 2, thus preventing blurs on the sheet 6. Since the sheet 6 is strained, enough space can be kept between the sheet 6 and the glass plate of the fixing device 9 so that there is no likelihood that the sheet 6 is burnt by the remaining heat of the fixing device 9.

The set time $t_2$ from the stop of the tractor 12 until the stop of the discharge rollers 14 and the scuff rollers 15 depends on the degree of the electrostatic attraction force generated between the photosensitive drum 2 and the sheet 6. It is therefore desirable to adjust the set time $t_2$ according to various conditions in the electrophotographic process such as the electric resistance of the sheet 6, temperature and humidity in the apparatus, and the charging, developing, transferring, cleaning and electric discharging conditions of the photosensitive drum 2.

FIGS. 24 to 29 show the relationship between the electrostatic attraction force generated between the photosensitive drum 2 and the sheet 6 and the above conditions in the electrophotographic process.

Figure 24:
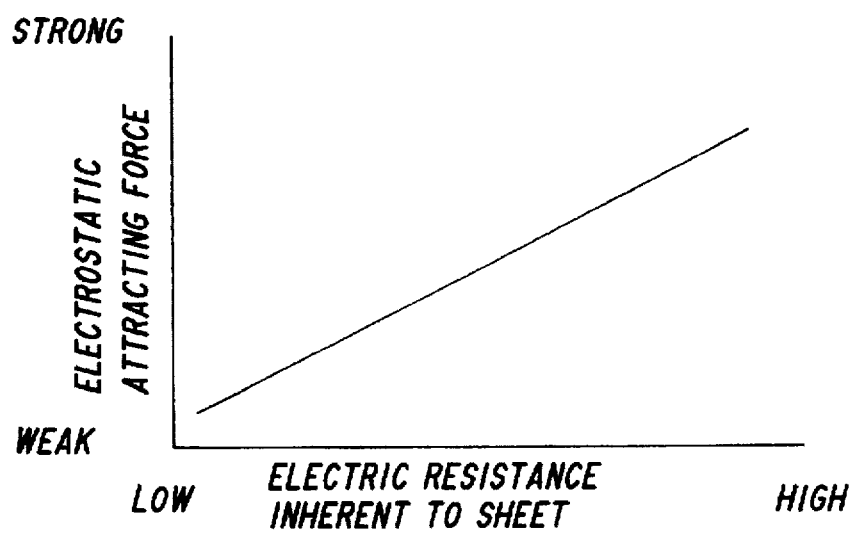

It is understood from FIG. 24 that the electrostatic attraction force between the photosensitive drum 2 and the sheet 6 increases as the electric resistance of the sheet 6 increases. Therefore, the set time $t_2$ is controlled by the CPU 81 in accordance with the thickness of the sheet 6 which has been set by the paper quantity switching button Sm, such that the thicker the stacked sheet 6 is, the longer the set time $t_2$ becomes.

Figure 25:
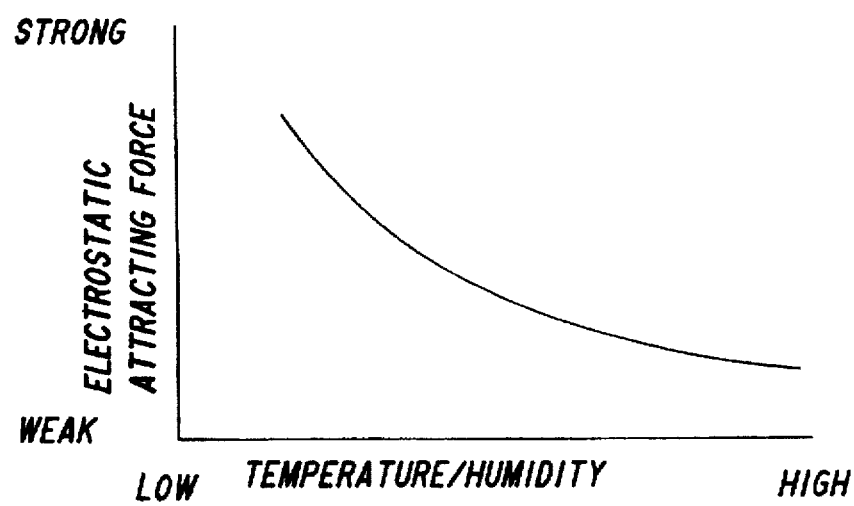
Figure 26:
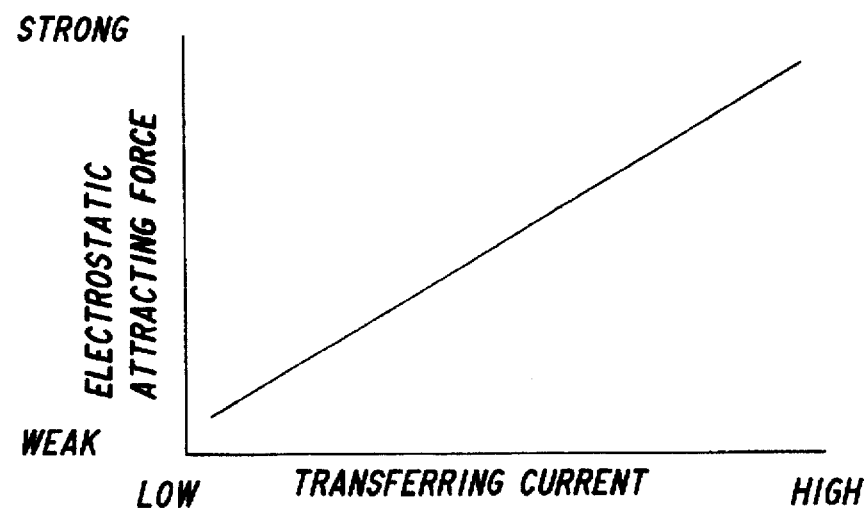
Figure 27:
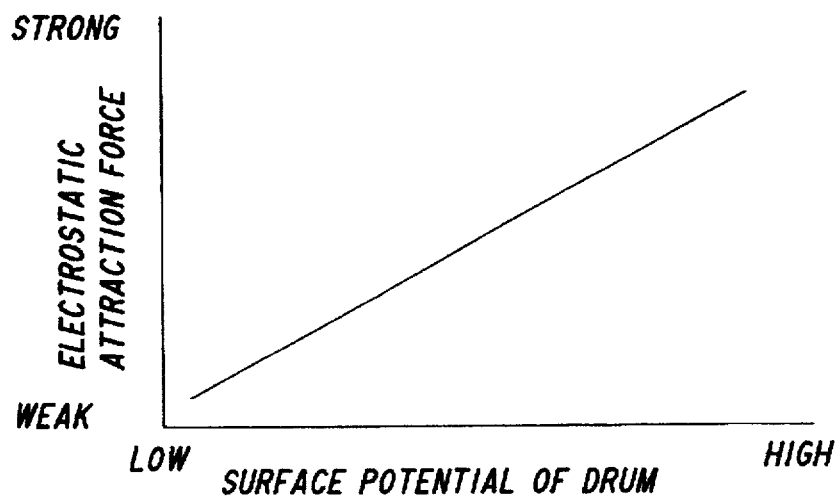
Figure 28:
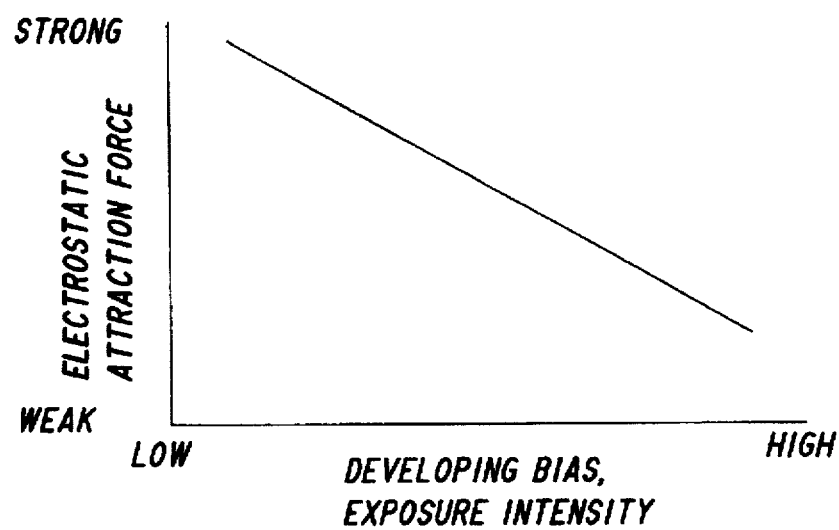

As understood from FIG. 25, the electrostatic attraction force between the photosensitive drum 2 and the sheet 6 increases as temperature and humidity in the apparatus creases. Therefore, the temperature and humidity in the apparatus are detected by the temperature sensor St and the humidity sensor Sw respectively, and the set time $t_2$ to be stored in the memory 91 is controlled by the CPU 81 in accordance with the detected values that the lower temperature and humidity become, the longer the set time $t_2$ becomes It is understood from FIGS. 26 to 28 that the electrostatic attraction force between the photosensitive drum 2 and the sheet 6 increases as the transferring current informed from the mechanical controller to the CPU 81 through the bus 89 increases (FIG. 26), that the electrostatic attraction force increases as the surface potential of the photosenstive drum 2 detected by the surface potential sensor Sv increases (FIG. 27), and that the electrostatic attraction force increases as the bias voltage and exposure intensity of the developing device decrease (FIG. 28). Since the electrostatic attraction force between the photosensitive drum 2 and the sheet 6 varies in compliance with changes in one or more condition of electrophotographic process including transferring current, the surface potential of the photosensitive drum 2 and the bias voltage and exposure intensity of the developing device, the set time $t_2$ to be stored in the memory 91 is also changed according to changes in these conditions.

Figure 29:
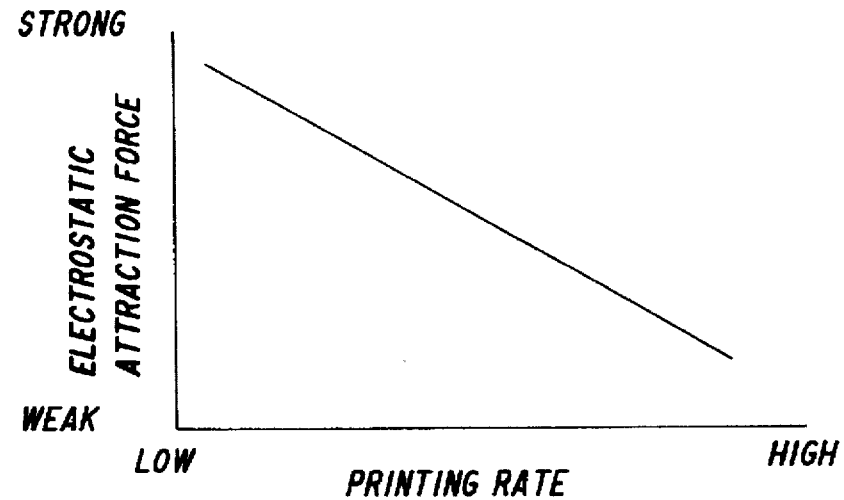

It is further understood from FIG. 29 that the electrostatic attraction force between the photosensitive drum 2 and the sheet 6 increases as the printing rate decreases. Therefore, the CPU 81 calculates the printing rate and controls the set time $t_2$ to be stored in the memory 91 such that the lower the printing rate becomes, the longer the set time $t_2$ becomes.

By the use of the paper slack preventing system of the embodiment, even if the sheet 6 is slackened in the downstream of the photosensitive drum 2, the slack will be eliminated before starting the operation of the photosensitive drum 2 so that the damage of images and blurs on the sheet can be avoided. Further, since the sheet 6 is detached from the photosensitive drum 2 at the time of suspension of printing, the sheet 6 can be prevented from touching the continuously rotating photosensitive drum 2 so that blurs on the sheet 6 can be positively prevented.

Another embodiment of the paper slack preventing system will be described with reference to FIGS. 30 and 31.

The paper slack preventing system of this embodiment includes a suction fan 104 in the downstream of the photosensitive drum 2. The suction fan 104 functions as a suction means for attracting the sheet 6 from the face opposite to its printing surface in the direction to separate the sheet 6 from the photosensitive drum 2. The suction fan 104 is driven by a motor 107 which is controlled by the CPU 81 through an I/O register 105 and a motor driver 106, whereby an air suction control is performed.

Figure 30:
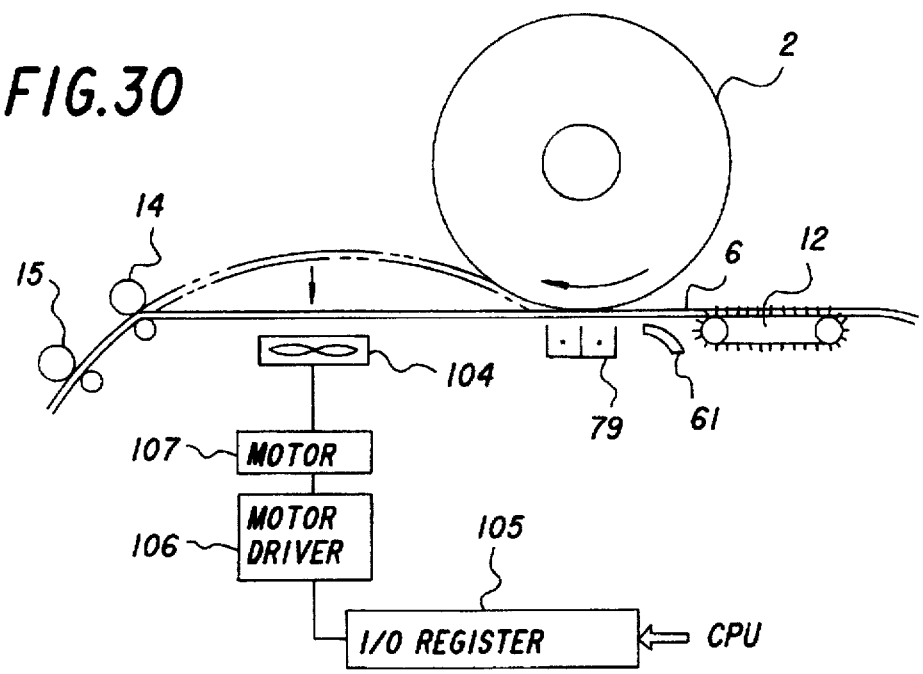
Figure 31A:
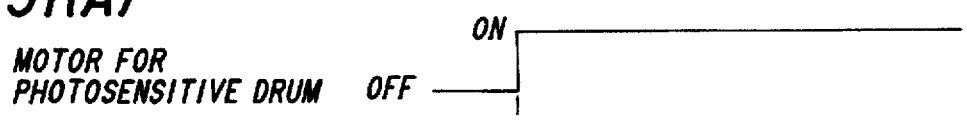
Figure 31B:
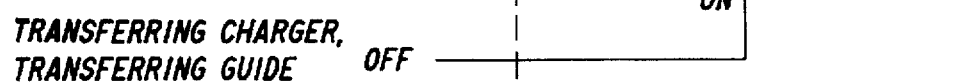
Figure 31C:
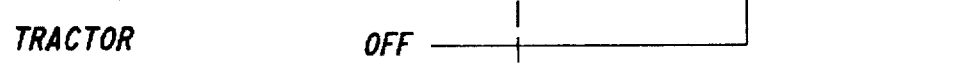
Figure 31D:
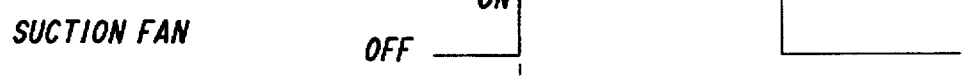
Figure 31E:

In the apparatus having the above arrangement, the suction fan 104 is actuated (FIG. 31(d)) simultaneously with a start-up of the photosensitive drum 2 (FIG. 31(a)), and even if the sheet 6 is slackened as indicated by the broken line in FIG. 30, the slackened portion is attracted by the suction fan 104 so as not to come in contact with the photosensitive drum 2. After the time $t_1$ has elapsed after the actuation of the photosensitive drum 2 and the suction fan 104, the transferring guide 61, the transferring charger 79, the tractor 12, the discharge rollers 14 and the scuff rollers 15 are actuated simultaneously (FIGS. 31(b), 31(c), 31(e)) and the suction fan 104 is stopped after printing operation is started (FIG. 31(d)). This prevents the sheet 6 from touching the photosensitive drum 2 before the start of the delivery of the sheet 6 so that blurs on the sheet 6 and the damage of images which been transferred but not yet fixed can be avoided.

In the above embodiment, a suction belt may be used instead of the suction fan 104.

In cases where the fixing device 9 of the heating roller type is used, the fixing device 9 may be continuously operated after the stop of the tractor 12.

(4) Paper folding system

Reference is now made to FIGS. 31 to 40 for describing a paper folding system for folding a continuous sheet sent out from the image forming station such that the front face and back face of the sheet face up alternately.

Figure 32:
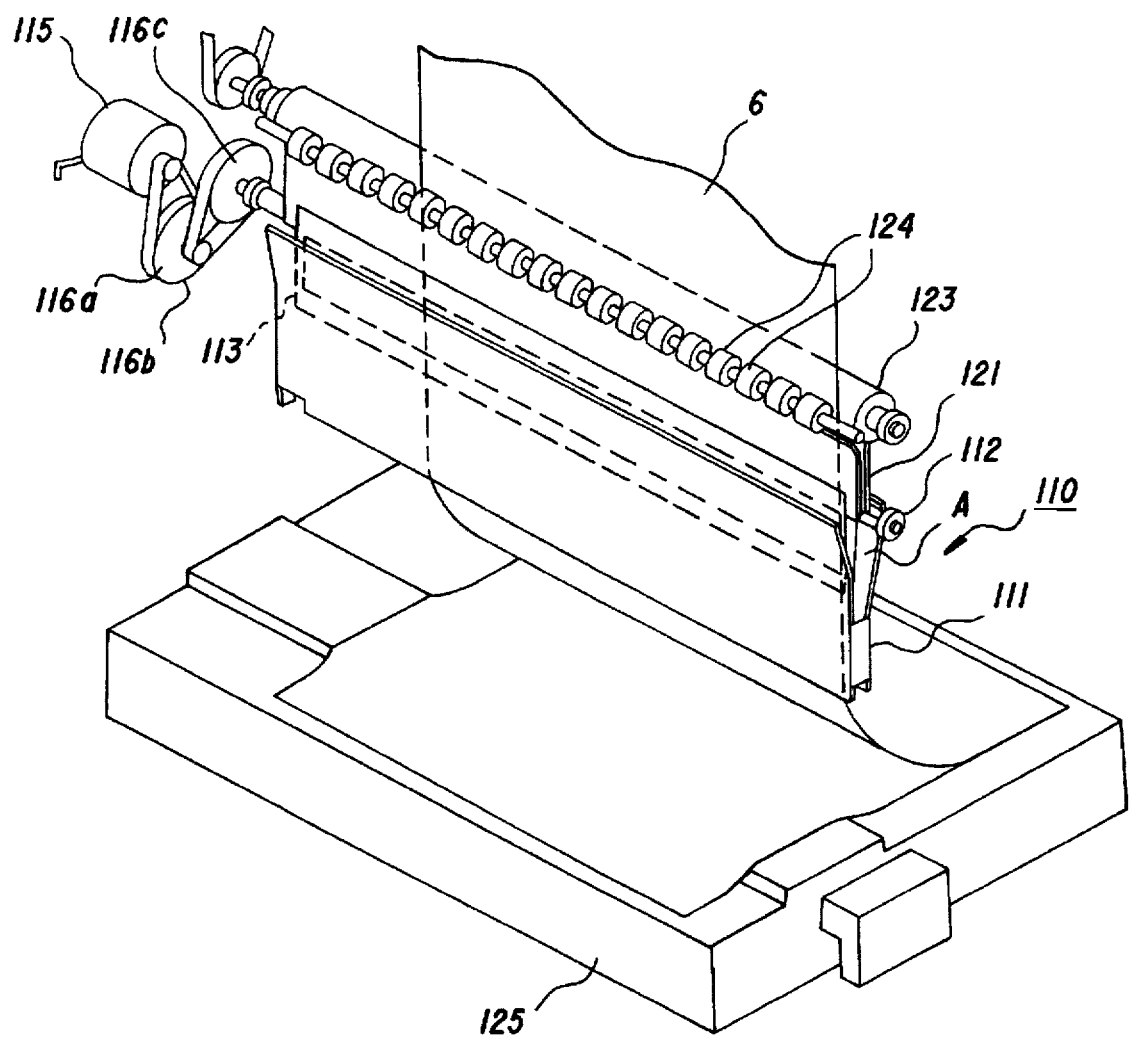

FIG. 32 shows a paper folding system 110 according to this embodiment. The paper folding system 110 is disposed at the stacker unit 11 (see FIG. 1) and includes a swing guide 111 and a movable paper guide 113. The swing guide 111 swings through a specified angle in the downstream of a fixed paper guide 121 which is disposed in the position where the sheet (continuous form) 6 comes out after images have been printed thereon. The movable paper guide 113 is formed of a flexible sheet material and follows the movement of the swing guide 111.

Figure 33:
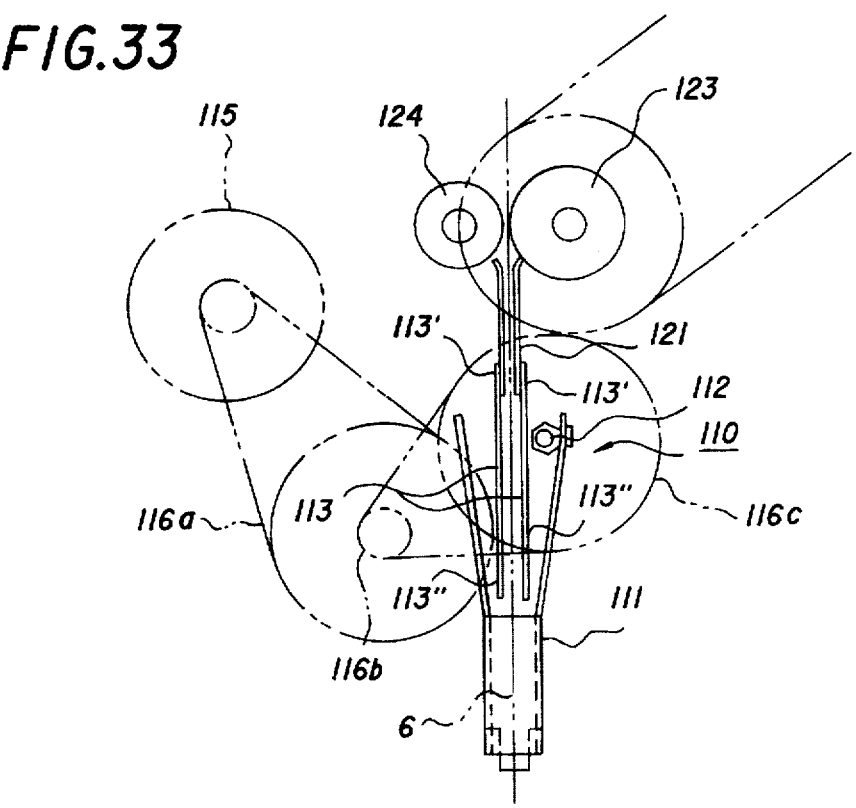

As shown in FIGS. 32 and 33, the swing guide 111 is arranged under the fixed paper guide 121 disposed at the end of the discharging station from which the sheet 6 bearing images thereon is sent out by the delivery means of the image forming apparatus 1 and is attached, at the upper end thereof, to a rotary shaft 112 supported by the body frame (not shown) such that it swings back and forth (in a direction perpendicular to the surface of the sheet 6) through a specified angle. The swing guide 111 is formed of two sheets (metal sheets) opposite to each other with a predetermined spacing. The respective upper half portions of the sheets are outwardly inclined and the sheets are connected to each other by side sheets disposed at both sides thereof, so that the swing guide 111 is made in the form of an elongated box whose upper and lower ends are open. When the swing guide 111 is in its suspended condition, its center line is substantially coincident with the vertical line along which the sheet 6 comes out from the fixed paper guide 121. The swing guide 111 swings through a specified angle, being driven by a motor 115 through the rotary shaft 112. Specifically, the movement of the motor 115 is transmitted to the rotary shaft 112 through pulleys 116a, 116b, 116c so that the rotary shaft 112 is forwardly and reversely turned through a specified rotation angle, whereby the swing guide 111 swings through a specified angle.

The movable paper guide 113 is disposed at a paper passing position A located between the swing guide 111 and the lower end of the fixed paper guide 121 disposed over the swing guide 111. The movable paper guide 113 is made of two rectangular, flexible sheets which are opposite to each other to form a traveling path for the sheet 6 therebetween. The movable paper guide 113 has a base end 113' secured to the fixed paper guide 121 and a movable end 113" which has such a length as can be inserted in the swing guide 111 and a width extending over the entire width of the swing guide 111. The flexible sheets forming the movable paper guide 113 may be sheets made from a synthetic resin such as polyester and polypropylene or extremely thin metal sheets. Desirably, the base end 113' of the movable paper guide 113 is reinforced by a suitable backing material.

Figure 34:
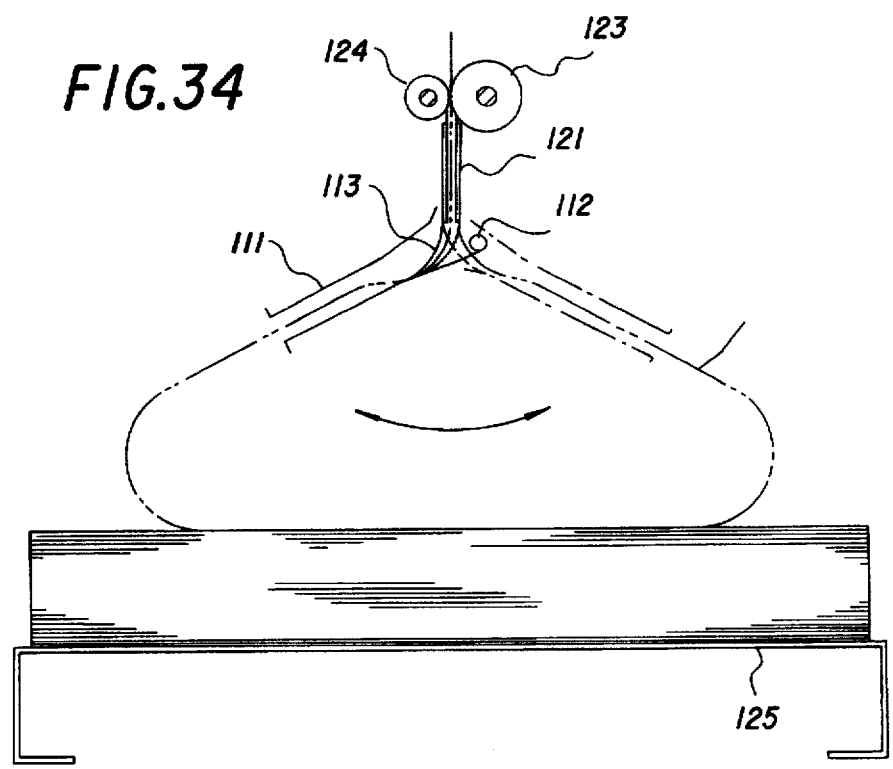

In the paper folding system 110 as described above, the paper sheet 6 on which images have been formed is delivered to the fixed paper guide 121 by a feed roller 123 which rotate at a specified speed receiving a driving force from the paper delivery system in the image forming apparatus 1. After passing the fixed paper guide 121, the sheet 6 is held by the movable paper guide 113 having flexibility and guided into the swing guide 111 as shown in FIG. 34. With this arrangement, even if the swing guide 111 swings largely at a specified angle being driven by the motor 115, the movable paper guide 113 follows the swing movement of the swing guide 111, with its movable portion being transformed into an arc form, so that the travel of the sheet 6 can be stably performed without interruption. The sheet 6 is then shaken down by the swing guide 111 and folded according to the folding lines onto a table 125 such that the front face and back face of the sheet 6 alternately face up. A plurality of presser rollers 124 are disposed opposite to the feed roller 123, being pressed against the feed roller 123 by known means (not shown) and the sheet 6 is held between the presser rollers 124 and the feed roller 123 to be sent out smoothly.

Figure 35:
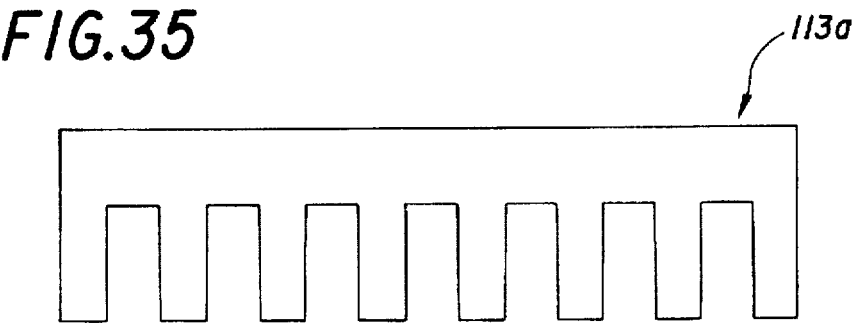
Figure 36:
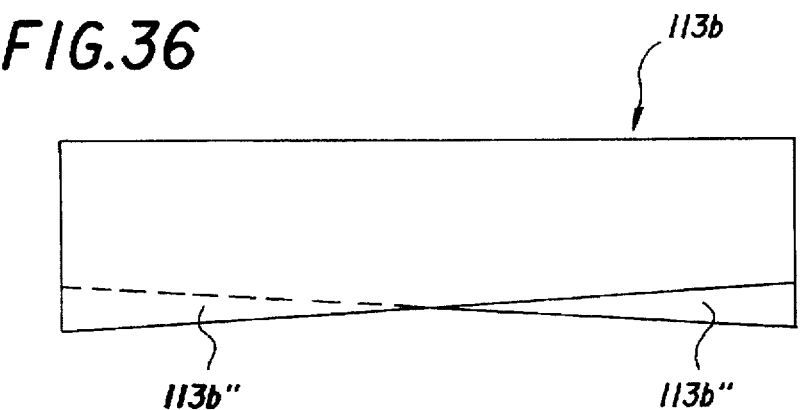

The movable paper guide 113 in the form of a rectangle has been described in the foregoing embodiment. Since such a rectangular movable paper guide 113 is formed of flexible sheets and its movable portion is transformed into the form of an arc by the swing movement of the swing guide 111 as mentioned above, the movable end 113" sticks to the sheet 6, imposing a load on the sheet 6. This problem can be solved by employing a movable paper guide 113a in the form of a comb as shown in FIG. 35. The use of the comb-shaped guide 113a reduces the load which is imposed on the sheet 6 when the sheet 6 escapes from the leading end of the movable paper guide 113a sticking thereto. Another arrangement for reducing the load imposed on the sheet 6 is shown in FIG. 36. In a movable paper guide 113b shown in FIG. 36, the ends (corresponding to the movable end 113b") of two sheets are cut obliquely to the width direction and these sheets are arranged such that the cut lines are inclined in opposite directions. With the above structural arrangement, the two sheets do not fit with each other at the movable end 113b " of the movable paper guide 113b so that the leading end of the movable paper guide 113b can be prevented from sticking to the paper sheet 6, thereby reducing the load imposed on the sheet 6.

Figure 37:
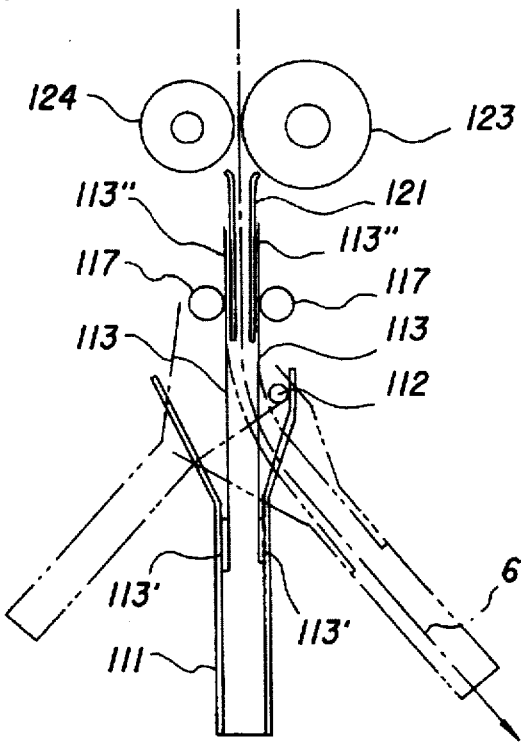

The movable paper guide 113 may be arranged as shown in FIG. 37 in which the base end 113' and the movable end 113" are reversely positioned. Specifically, the base end 113' is secured to the inside of the swing guide 111 while the movable end 113" is positioned on a side of the fixed paper guide 121 being held so as to be movable e.g. in the width direction, by means of guide rollers 117, 117 which function as a guide regulating member. This keeps the space between the movable guide 113 and the sheet 6 constant, thereby reducing the load imposed on the sheet 6 during the travel of the sheet 6. Such guide rollers 117, 117 are rotatably supported by a bearing (not shown) in the exterior of the fixed paper guide 121.

Figure 38A:
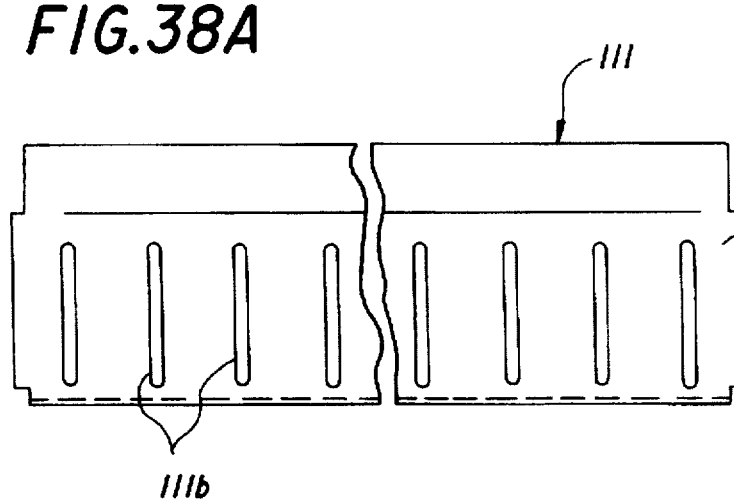
FIG. 38A is a front view of another swing guide.
Figure 38B:
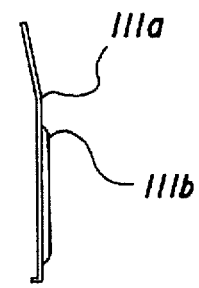
FIG. 38B is a side view of the swing guide shown in FIG. 38A.

The swing guide 111 may be arranged as shown in FIGS. 38A and 38B. In this example, there are provided a plurality of projecting bars 111b bulged so as to take the form of a circle elongated in the travel direction of the sheet 6 (the shape is not limited to an elongated circle). Such projecting bars 111b are spaced at suitable intervals on the inner faces of two sheets 111a, 111a (only one sheet is shown in the drawing for the convenience of illustration) which constitute the swing guide 111. This makes it possible to reduce the friction resistance generated between the sheet 6 and the swing guide 111 and to increase the rigidity of the swing guide 111.

Figure 39:
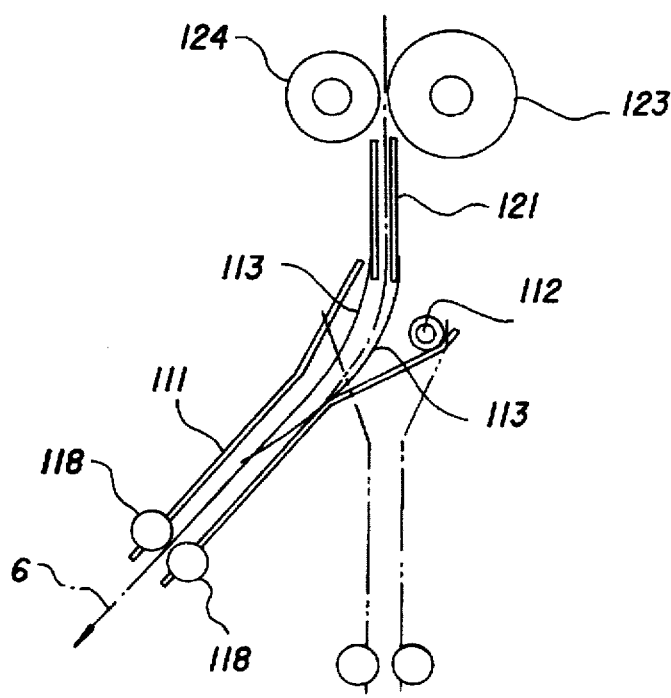

Further, the arrangement shown in FIG. 39 may be employed. In this arrangement, a pair of second feed rollers 118 are juxtaposed at the leading end of the swing guide 111, and a driving force is transmitted by belts from the feed roller (first feed roller) 123 attached to the fixed paper guide 121 to the second feed rollers 118, 118 via a relay pulley (not shown) disposed on the rotary shaft 112. The circumferential speed of the second feed rollers 118, 118 is somewhat faster than that of the first feed roller 123. This prevents the slack of the sheet 6 within the swing guide 111. It should be noted that the second feed rollers 118, 118 can be driven by an independent driving machine.

Figure 40A:
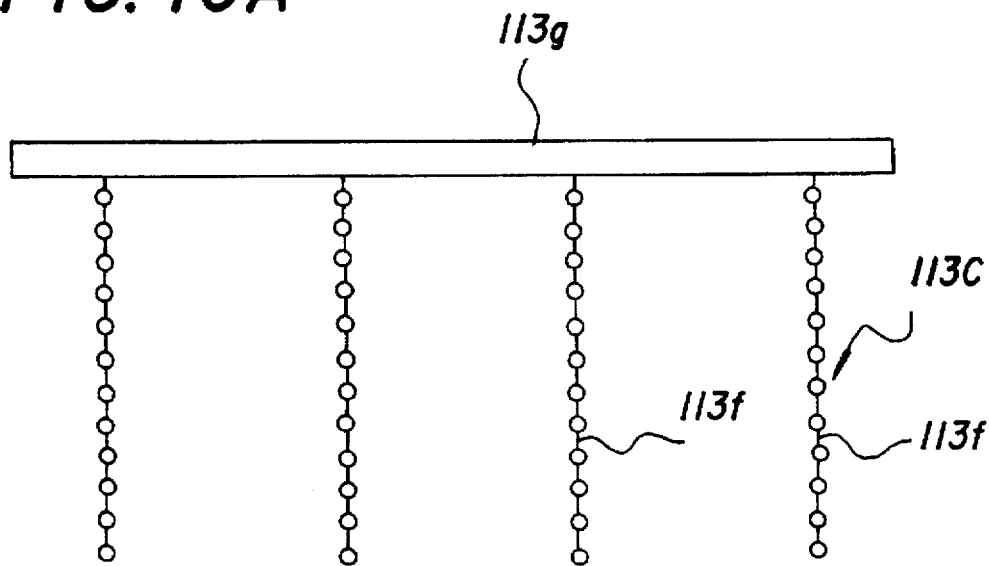
FIG. 40A is a front view of still another movable paper guide.
Figure 40B:
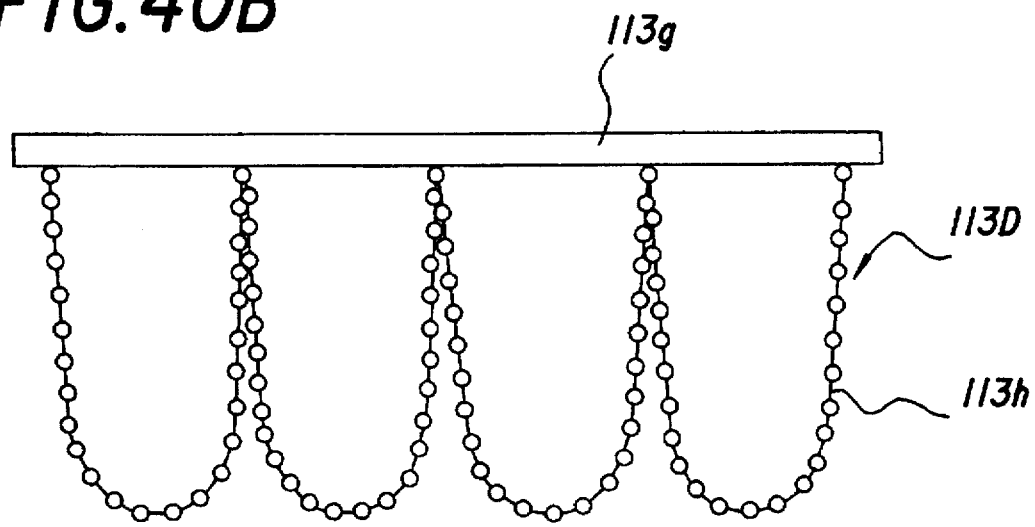
FIG. 40B is a front view showing a modified example of the movable paper guide shown in FIG. 40A.
Figure 41:
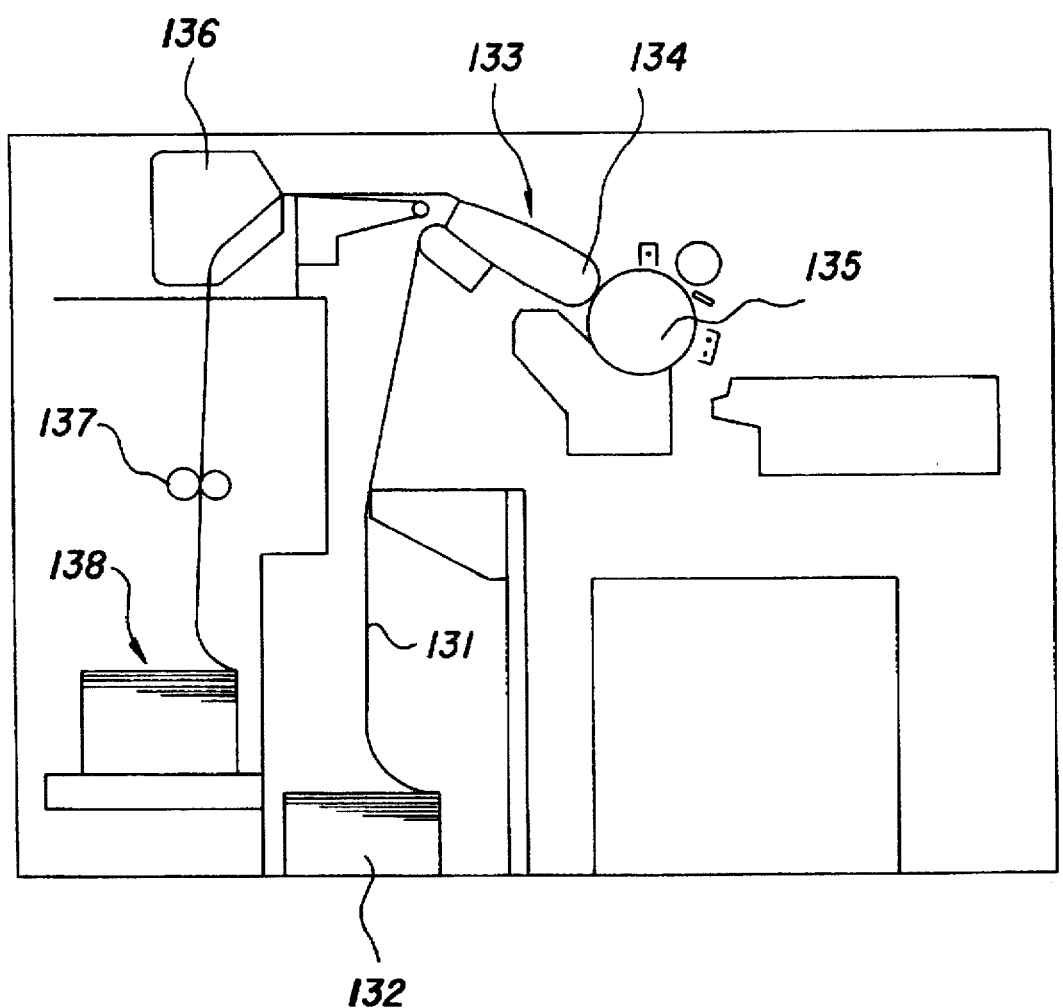
FIG. 41 is a schematic view showing a principal part of a conventional image forming apparatus.

Although the movable paper guide formed of flexible sheets has been described, it is also possible to use a deformable bar-like member as the movable paper guide. FIGS. 40A and 40B show a movable paper guide 113C and a movable paper guide 113D in which chains 113f and 113h are used respectively. As shown in FIG. 40A, the movable paper guide 113C is composed of a lateral member 113g made of a metal sheet or other material having a length which corresponds to the width of the swing guide 111 and a plurality of chains 113f having the same length. The length of the chains 113f is so specified as to be accommodated within the swing guide 111 (see FIG. 33). The respective chains 113f are spaced at specified intervals and suspended from the lateral member 113g with one end being fixedly attached to the member 113g. The movable paper guide 113D shown in FIG. 40B is arranged such that a chain 113h of a specified length is fixedly attached, at both ends and intermediate positions, to the lateral member 113g which is similar to that of FIG. 40A. The attached positions are spaced at specified intervals so that the chain 113h suspends from the member 113g with a length which can be accommodated in the swing guide 111. Instead of using the chain 113h fixed at both ends and intermediate positions, four chains of a specified length may be fixedly attached, at both ends, to the lateral member 113g in the same manner as shown in FIG. 40B.

Similarly to the case where the flexible sheets are used, the movable paper guides 113C and 113D described above are used in such a manner that the lateral member 113g is secured to the fixed paper guide 121 (see FIG. 3) and the leading end portions of the chains 113f (113h) are suspended within the swing guide 111. The chains 113f and 113h may be known ball chains or chains formed from connected links. The chains 113f, 113h may be made from a synthetic resin or metal. When metal chains are used, static electricity generated on the sheet 6 can be advantageously eliminated by connecting an earth wire to the body frame (not shown) of the image forming apparatus 1 from the lateral member 113g.

By the use of the paper folding system of the foregoing embodiment, the sheet 6 which has been sent by the feed roller is pinched and guided by the flexible, movable paper guide, and therefore, even if the swing guide swings at a large angle, the sheet 6 will be prevented from being jammed in the swing guide and will be folded properly without causing any problems.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An image forming apparatus, comprising a paper delivery unit which comprises:
   a transferring device for transferring a toner image from a photosensitive drum onto a sheet;
   a first feeder for feeding the sheet, disposed in the upstream of the transferring device in a paper delivery direction;
   a second feeder for holding and delivering the sheet, disposed in the downstream of the transferring device in the paper delivery direction; and
   a delivery unit frame, operably coupled and pivotally supported by a body frame disposed in the upstream in the paper delivery direction, having plates with a space therebetween, wherein the transferring device, the first feeder and the second feeder are supported by the delivery unit frame within the space between the plates.

2. The image forming apparatus as claimed in claim 1, further comprising a supporting link system having upper links and lower links, each upper link being coupled to either of the lower links by an intermediate connecting pin, wherein the upper end of each upper link is connected to a movable end of the paper delivery unit while the lower end of each lower link is movably supported by the body frame.

3. The image forming apparatus as claimed in claim 2, wherein a fulcrum shaft provided at the lower ends of the lower links is in contact with fulcrum shaft supporting springs which act in a direction to raise the fulcrum shaft, and the fulcrum shaft moves downwards only when each of the intermediate connecting pins exceeds a dead point line.

4. The image forming apparatus as claimed in claim 3, further comprising:
   an operation handle system which is provided in the exterior of the body frame as to be coupled to the supporting link system; and
   lock releasing means consisting of parts provided at the base end of the operation handle system and at the side of the body frame opposite to said base end, used for releasing the paper delivery unit from its locked condition established by the supporting link system, when the operation handle system is operated.

5. The image forming apparatus as claimed in claim 4, wherein the operation handle system comprises a lever with its base end fixedly attached to the fulcrum shaft of the supporting link system outside the body frame; and a handle with its base end pivotally supported at a leading end of the lever so that the handle can be raised and brought down.

6. The image forming apparatus as claimed in claim 5, wherein the lever of the operation handle system is secured to the fulcrum shaft at the base end thereof in such a manner that the lever is opposite to one of the lower links of the supporting link system.

7. The image forming apparatus as claimed in claim 6, wherein the lock releasing means comprises a cam which is provided on the outer face of the body frame so as to face the position where the lever and handle of the operation handle system are pivotally attached to each other, when the paper delivery unit is set in the operating position; and a releasing member attached to the base end of the handle, being opposite to the cam.

8. The image forming apparatus as claimed in claim 7, wherein the lock releasing means is designed to release lifting force exerted on the fulcrum shaft of the supporting link system by engaging the releasing member with an inclined surface of the cam, such engagement being accomplished by raising the handle.

9. The image forming apparatus as claimed in claim 1, further comprising energizing devices which are torsion coil springs arranged such that a movable operating part of the torsion coil springs faces the pivotally supported side of the paper delivery unit.

10. The image forming apparatus as claimed in claim 9, wherein the movable operating part comprises a supporting spring saddle attached to the torsion coil springs, and rollers which are disposed at the leading end of the supporting spring saddle, being in contact with the bottom face of the paper delivery unit.

11. The image forming apparatus as claimed in claim 1, wherein the first feeder is a tractor and the second feeder is a suction feeder.

12. An image forming apparatus including a transferring guide comprising:
   (a) a first paper guide means for pressing one face of a sheet such that the sheet moves in a direction to be separated from a photosensitive drum;
   (b) a second paper guide means for pressing the other face of the sheet such that the sheet moves in a direction to come in close contact with the photosensitive drum and;
   (c) a driving means being coupled with the first paper guide means and the second paper guide means respectively for driving the first and second paper guide means at the same time by rotating a driving shaft.

13. The image forming apparatus as claimed in claim 12, wherein the first paper guide means presses the upper face of the sheet downwards while the second paper guide means presses the lower face of the sheet upwards.

14. The image forming apparatus as claimed in claim 12 or 13, wherein the first and second paper guide means hold the sheet at three positions, which are a close position where the sheet is in close contact with the photosensitive drum, a remote position where the sheet is separated from the photosensitive drum and an automatic loading position which is located substantially midway between the close position and the remote position and where the sheet is automatically loaded.

15. The image forming apparatus as claimed in claim 12 or 13, wherein the driving means is a link system for driving the first and second paper guide means such that the first paper guide means performs its operation faster than the second paper guide means.

16. The image forming apparatus as claimed in claim 15, wherein the link system includes, on both sides, a substantially L-shaped rocking lever having an end secured to the driving shaft; and two coupling arms pivotally attached to the other end of the rocking lever at one end thereof by means of two pins which are substantially equidistant from the driving shaft, being shifted from each other by a specified angle with respect to the driving shaft, the other ends of the coupling arms being pivotally attached to the first paper guide means and the second paper guide means respectively.

17. The image forming apparatus as claimed in claim 12 or 13, wherein the transferring guide is formed as one unit.

18. An image forming apparatus comprising:
   (a) an upstream paper delivery means provided in the upstream of a photosensitive drum in a paper delivery path;
   (b) a downstream paper delivery means provided in the downstream of the photosensitive drum in the paper delivery path; and
   (c) a controller means for actuating the downstream paper delivery means at substantially the same time when the photosensitive drum starts operation, and actuating the upstream paper delivery means after a specified time has elapsed after a start-up of the photosensitive drum.

19. An image forming apparatus, comprising:
   (a) an upstream paper delivery means provided in the upstream of a photosensitive drum in a paper delivery path;
   (b) a downstream paper delivery means provided in the downstream of the photosensitive drum in the paper delivery path; and
   (c) a controller means for stopping the operation of the downstream paper delivery means after a preset time has elapsed after stopping of the upstream paper delivery means, wherein the controller means includes a setting means for setting a preset time, the preset time being varied.

20. The image forming apparatus as claimed in claim 19, wherein the preset time is varied in accordance with an electric resistance inherent to a sheet.

21. The image forming apparatus as claimed in claim 19, wherein the preset time is varied in accordance with temperature and humidity.

22. The image forming apparatus as claimed in claim 19, wherein the preset time is varied in accordance with transferring current.

23. The image forming apparatus as claimed in claim 19, wherein the preset time is varied in accordance with a surface potential of the photosensitive drum.

24. The image forming apparatus as claimed in claim 19, wherein the preset time is varied in accordance with a bias voltage and exposure intensity of a developing device.

25. The image forming apparatus as claimed in claim 19, wherein the preset time is varied in accordance with a printing rate which is the rate of images printed on a sheet, the printing rate being detected by printing rate detector means.

26. An image forming apparatus comprising:
   (a) an upstream paper delivery means provided in the upstream of a photosensitive drum in a paper delivery path;
   (b) a downstream paper delivery means provided in the downstream of the photosensitive drum in the paper delivery path;
   (c) a contact preventing means provided between the downstream paper delivery means and the photosensitive drum, for preventing a sheet positioned between the downstream paper delivery means and the photosensitive drum from coming in contact with the photosensitive drum; and
   (d) a controller means for actuating the contact preventing means at substantially the same time when the photosensitive drum starts operation or prior to the start-up of the photosensitive drum, and actuating the upstream paper delivery means and the downstream paper delivery means at substantially the same time after a specified time has elapsed after the start-up of the contact preventing means.

27. The image forming apparatus as claimed in claim 26, wherein the controller means stops the operation of the contact preventing means after starting printing.

28. The image forming apparatus as claimed in claim 26 or 27, wherein the contact preventing means is a suction fan provided so as to face a surface of the sheet, the surface being opposite to an image bearing surface of the sheet.

29. The image forming apparatus as claimed in claim 26 or 27, wherein the contact preventing means is a suction belt provided so as to face a surface of the sheet, the surface being opposite to an image bearing surface of the sheet.

30. An image forming apparatus having a paper folding system, comprising:
   a feed roller for sending out a sheet;
   a swing guide means, which swings through a specified angle, for folding said sheet such that the front face and back face of said sheet alternately face up; and
   a movable paper guide which is disposed between the feed roller and the swing guide and swings following the swing movement of the swing guide,
   wherein the movable paper guide has
      a base end fixedly attached to a fixed paper guide disposed under the feed roller.

31. The image forming apparatus as claimed in claim 30, wherein the movable end of the movable paper guide is held in a movable condition by a guide regulating member attached to a fixed paper guide.

32. The image forming apparatus as claimed in claim 30, wherein the movable paper guide is formed of two sheets whose ends corresponding to a movable end are cut obliquely to the width direction and the two sheets are so arranged that the inclining directions of their cut ends are opposite to each other.

33. The image forming apparatus as claimed in claim 30, wherein a movable end of the movable paper guide is in the form of a comb.

34. The image forming apparatus as claimed in any one of claims 31 to 33, wherein the movable paper guide is formed of synthetic resin sheets or extremely thin metal sheets.

35. The image forming apparatus as claimed in claim 30, wherein the movable paper guide comprises a lateral member having a base end attached to the fixed paper guide; and a plurality of chains of a specified length which are spaced at specified intervals, each suspending with one end secured to the lateral member.

36. The image forming apparatus as claimed in claim 30, wherein the swing guide is provided, at both inner faces thereof, with a plurality of projecting bars which are bulged out in the travel direction of the sheet.

37. The image forming apparatus as claimed in claim 30, wherein the swing guide is provided, at a leading end thereof, with second feed rollers driven by an independent driving machine or by power transmitted from a paper delivery system.

38. An image forming apparatus having a paper folding system, comprising:
   a feed roller for sending out a sheet;
   a swing guide means, which swings through a specified angle, for folding said sheet such that the front face and back face of said sheet alternately face up; and a movable paper guide which is disposed between the feed roller and the swing guide and swings following the swing movement of the swing guide, wherein the movable paper guide has a base end fixedly attached to the inside of the swing guide and a movable end held on a side of a fixed paper guide.

39. The image forming apparatus as claimed in claim 38, wherein the movable end of the movable paper guide is held in a movable condition by a guide regulating member attached to the fixed paper guide.

40. The image forming apparatus as claimed in claim 38, wherein the movable paper guide is formed of two sheets whose ends corresponding to a movable end are cut obliquely to the width direction and the two sheets are so arranged that the inclining directions of their cut ends are opposite to each other.

41. The image forming apparatus as claimed in claim 38, wherein the movable end of the movable paper guide is in the form of a comb.

42. The image forming apparatus as claimed in any one of claims 39-41, wherein the movable paper guide is formed of synthetic resin sheets or extremely thin metal sheets.

43. The image forming apparatus as claimed in claim 38, wherein the movable paper guide comprises a lateral member having a base end attached to the fixed paper guide; and a plurality of chains of a specified length which are spaced at specified intervals, each suspending with one end secured to the lateral member.

44. The image forming apparatus as claimed in claim 38, wherein the swing guide is provided, at both inner faces thereof, with a plurality of projecting bars which are bulged out in the travel direction of the sheet.

45. The image forming apparatus as claimed in claim 38, wherein the swing guide is provided, at the leading end thereof, with second feed rollers driven by an independent driving machine or by power transmitted from a paper delivery system.

* * * * *